(12) United States Patent
Lin et al.

(10) Patent No.: US 11,095,396 B2
(45) Date of Patent: Aug. 17, 2021

(54) EFFICIENT POLAR DETECTION WITH DYNAMIC CONTROL AND OPTIMIZATION

(71) Applicant: QUALCOMM Incorporated, San Diego, CA (US)

(72) Inventors: Jamie Menjay Lin, San Diego, CA (US); Siddhartha Mallik, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 35 days.

(21) Appl. No.: 16/111,036

(22) Filed: Aug. 23, 2018

(65) Prior Publication Data

US 2020/0067639 A1    Feb. 27, 2020

(51) Int. Cl.
*H04L 1/00* (2006.01)
*H04W 84/04* (2009.01)

(52) U.S. Cl.
CPC .......... *H04L 1/0058* (2013.01); *H04L 1/0045* (2013.01); *H04L 1/0061* (2013.01); *H04W 84/04* (2013.01)

(58) Field of Classification Search
CPC ... H04L 1/0058; H04L 1/0061; H04L 1/0045; H04W 84/04
See application file for complete search history.

(56) References Cited

PUBLICATIONS

Ali H.S., et al., "Fast Simplified Successive-Cancellation List Decoding of Polar Codes", 2017 IEEE Wireless Communications And Networking Conference Workshops (WCNCW), IEEE, 19 Mar. 2017 (Mar. 19, 2017), pp. 1-6, XP033093164, DOI: 10.1109/WCNCW.2017.7919044, [retrieved on May 3, 217], section (Year: 2007).*

Giard P. et al., "Blind Detection of Polar Codes", arxiv.org, Cornell University Library, 201 Olin Library Cornell University Ithaca, NY 14853, May 5, 2017 (May 5, 2017), XP081279352, 6 Pages, DOI: 10.1109/SIPS.2017.8109977, section III (Year: 2017).*

Qualcomm: "Evaluation of Early Termination for Polar Codes", 3GPP Draft; R1 -1711215 Evaluation of Early Termination for Polar Codes, 3rd Generation Partnership Project (3GPP), Mobile Competence Centre, 650, Route Des Lucioles, F-06921 Sophia-Antipolis Cedex, France, vol. RAN WG1, No. Qingdao; (Year: 2017).*

(Continued)

*Primary Examiner* — April Y Blair
*Assistant Examiner* — Rong Tang
(74) *Attorney, Agent, or Firm* — Holland & Hart LLP; Nerrie M. Zohn

(57) ABSTRACT

Methods, systems, and devices for wireless communications are described. A wireless device, such as a user equipment (UE) may monitor for a decoding candidate of a codeword, wherein the codeword corresponds to a set of received bit metrics, and the decoding candidate corresponds to a plurality of information bits encoded using a polar code, determine a composite detection metric for the codeword for the decoding candidate, where the composite detection metric is derived from a subset of bit metrics for an intermediate polarization layer of the polar code, and determine a classification for performing a list decoding process on the codeword according to the decoding candidate based at least in part on the composite detection metric.

30 Claims, 12 Drawing Sheets

(56) References Cited

PUBLICATIONS

Ali H.S., et al., "Fast Simplified Successive-Cancellation List Decoding of Polar Codes", 2017 IEEE Wireless Communications and Networking Conference Workshops (WCNCW), IEEE, Mar. 19, 2017 (Mar. 19, 2017), pp. 1-6, XP033093164, DOI: 10.1109/WCNCW.2017.7919044, [retrieved on May 3, 2017], section II.

Giard P., et al., "Blind Detection of Polar Codes", arxiv.org, Cornell University Library, 201 Olin Library Cornell University Ithaca, NY 14853, May 5, 2017 (May 5, 2017), XP081279352, 6 Pages, DOI: 10.1109/SIPS.2017.8109977, section III.

International Search Report and Written Opinion—PCT/US2019/047736—ISA/EPO—dated Nov. 15, 2019.

LG Electronics: "Early Termination Effect of Polar Codes", 3GPP Draft; R1-1710346_Early Termination Effect of Polar Code_Final, 3rd Generation Partnership Project (3GPP), Mobile Competence Centre ; 650, Route Des Lucioles; F-06921 Sophia-Antipolis Cedex ; FR, vol. RAN WG1, No. Qingdao, P.R. China; Jun. 27, 2017-Jun. 30, 2017, Jun. 26, 2017 (Jun. 26, 2017), XP051299560, 6 Pages, Retrieved from the Internet: URL:http://www.3gpp.org/ftp/Meetings_3GPP_SYNC/RAN1/Docs/ [retrieved on Jun. 26, 2017], section 2.

Qualcomm Incorporated: "Evaluation of Early Termination for Polar Codes", 3GPP Draft; R1-1711215 Evaluation of Early Termination for Polar Codes, 3rd Generation Partnership Project (3GPP), Mobile Competence Centre, 650, Route Des Lucioles, F-06921 Sophia-Antipolis Cedex, France, vol. RAN WG1, No. Qingdao; Jun. 27, 2017-Jun. 30, 2017, Jun. 20, 2017, XP051305802, Retrieved from the Internet: URL:http://www.3gpp.org/ftp/tsg_ran/WG1_RL1/TSGR1_AH/NR_AH_1706/Docs/ [retrieved on-Jun. 20, 2017], 16 pages, section 7.

\* cited by examiner

EFFICIENT POLAR DETECTION WITH DYNAMIC CONTROL AND OPTIMIZATION

BACKGROUND

The following relates generally to wireless communications, and more specifically to efficient polar detection with dynamic control and optimization.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some cases, a UE modem in an idle or connected mode may be required to monitor a search space for receiving control information by monitoring a plurality of blind PDCCH decoding hypothesis in a time duration, such as a slot. In some cases, such as while operating using multiple carriers (e.g., carrier aggregation (CA)), the number of required blind PDCCH decodes per slot may increase proportionally. In some cases, existing modem designs may perform brute force decoding for all the blind PDCCH hypotheses, even though a large proportion of the decoding candidates may be false. In such cases, the percentage of chip-awake time utilized due to the number of blind decodes may increase, which may adversely impact latency, power consumption, and/or chip area.

SUMMARY

The described techniques relate to improved methods, systems, devices, and apparatuses that support efficient polar detection with dynamic control and optimization. Generally, the described techniques provide for receiving and transmitting a codeword encoded using a polar code. An encoder obtains the codeword from a plurality of information bits as well as one or more frozen bits according to the polar code. In some cases, the codeword may be associated with a Physical Downlink Control Channel (PDCCH) carrying downlink control information (DCI). In some aspects, the techniques described herein may exploit one or more properties of polar codes in order to optimize the number of blind PDCCH decodes in RRC connected and/or idle mode.

In some cases, a polar detector may be defined to assess the quality of frozen bit components of the polar codeword. For instance, a composite detection metric may be determined for the codeword based on an observed set of log likelihood ratios (LLRs) or bit metrics associated with the polar code. In some cases, the composite detection metric may be used to estimate the likelihood of the observed set of LLRs being a polar codeword, or not. In some aspects, the composite detection metric may be defined using one or more estimators, or decoder components, which are in turn based on derived LLRs.

In some embodiments, the UE may determine whether to switch on polar detection based in part on one or more parameters, including Radio Resource Control (RRC) state (i.e., idle or connected), signal to noise ratio (SNR), prior polar detection, costs (e.g., power), etc. For example, the polar detection feature may be turned off when specific values for the parameters fall outside of the range of the threshold for switching on polar detection. While polar detection is switched on, the UE may further select between different operation modes (e.g., prioritization and/or qualification) for dynamic control and optimization of polar detection. In some cases, the prioritization mode may be deployed, such that the polar detector prioritizes the list of decoding candidates with a ranking based on estimation metrics. In some other cases, the qualification mode may allow the polar detector to qualify decoding candidates through hypothesis testing.

A method of wireless communication is described. The method may include monitoring for a decoding candidate of a codeword, where the codeword corresponds to a set of received bit metrics, and the decoding candidate corresponds to a set of information bits encoded using a polar code, determining a composite detection metric for the codeword for the decoding candidate, where the composite detection metric is derived from a first subset of bit metrics for an intermediate polarization layer of the polar code, and determining a classification for performing a list decoding process on the codeword according to the decoding candidate based on the composite detection metric.

An apparatus for wireless communication is described. The apparatus may include a processor, memory in electronic communication with the processor, and instructions stored in the memory. The instructions may be executable by the processor to cause the apparatus to monitor for a decoding candidate of a codeword, where the codeword corresponds to a set of received bit metrics, and the decoding candidate corresponds to a set of information bits encoded using a polar code, determine a composite detection metric for the codeword for the decoding candidate, where the composite detection metric is derived from a first subset of bit metrics for an intermediate polarization layer of the polar code, and determine a classification for performing a list decoding process on the codeword according to the decoding candidate based on the composite detection metric.

Another apparatus for wireless communication is described. The apparatus may include means for monitoring for a decoding candidate of a codeword, where the codeword corresponds to a set of received bit metrics, and the decoding candidate corresponds to a set of information bits encoded using a polar code, determining a composite detection metric for the codeword for the decoding candidate, where the composite detection metric is derived from a first subset of bit metrics for an intermediate polarization layer of the polar code, and determining a classification for performing a list decoding process on the codeword according to the decoding candidate based on the composite detection metric.

A non-transitory computer-readable medium storing code for wireless communication is described. The code may include instructions executable by a processor to monitor for a decoding candidate of a codeword, where the codeword corresponds to a set of received bit metrics, and the decoding candidate corresponds to a set of information bits encoded using a polar code, determine a composite detection metric for the codeword for the decoding candidate, where the composite detection metric is derived from a first subset of bit metrics for an intermediate polarization layer of the polar code, and determine a classification for performing a list decoding process on the codeword according to the decoding candidate based on the composite detection metric.

In some examples of the method, apparatuses, and non-transitory computer-readable medium described herein, the determining the classification for performing the list decoding process may include operations, features, means, or instructions for determining to suppress the list decoding process for the decoding candidate.

In some examples of the method, apparatuses, and non-transitory computer-readable medium described herein, the determining the classification for performing the list decoding process may include operations, features, means, or instructions for determining a ranking for performing the list decoding process on the codeword according to the decoding candidate relative to other decoding candidates of a set of decoding candidates for a codeword search space.

In some examples of the method, apparatuses, and non-transitory computer-readable medium described herein, determining the composite detection metric may include operations, features, means, or instructions for applying a weighting vector to the first subset of bit metrics.

In some examples of the method, apparatuses, and non-transitory computer-readable medium described herein, determining the composite detection metric may include operations, features, means, or instructions for applying a second weighting vector to a second subset of bit metrics associated with a second intermediate polarization layer of the polar code and applying one or more activation functions for combining the weighted first subset of bit metrics and the weighted second subset of bit metrics.

In some examples of the method, apparatuses, and non-transitory computer-readable medium described herein, determining the composite detection metric may include operations, features, means, or instructions for applying one or more weighting vectors to the first subset of bit metrics to obtain one or more intermediate composite metrics and applying one or more activation functions for combining the one or more intermediate metrics to obtain the composite detection metric.

In some examples of the method, apparatuses, and non-transitory computer-readable medium described herein, determining the composite detection metric may include operations, features, means, or instructions for determining derived bit metrics based on the first subset of bit metrics and a weighting pattern, the weighting pattern determined based on a number of information bits in a subset of leaf nodes corresponding to the first subset of bit metrics.

In some examples of the method, apparatuses, and non-transitory computer-readable medium described herein, determining the composite detection metric may include operations, features, means, or instructions for applying one or more activation functions for combining the derived bit metrics to obtain the composite detection metric.

In some examples of the method, apparatuses, and non-transitory computer-readable medium described herein, the first subset of bit metrics may be determined based on single parity check operations or repetition operations from bit metrics at a polarization layer feeding the intermediate polarization layer.

In some examples of the method, apparatuses, and non-transitory computer-readable medium described herein, the determining the classification for performing the list decoding process may include operations, features, means, or instructions for comparing the composite detection metric to a threshold, where the threshold may be based on a connection state, a signal metric, a device state, a detection history, a communication protocol, or a combination thereof.

In some examples of the method, apparatuses, and non-transitory computer-readable medium described herein, the first subset of bit metrics correspond to log-likelihood ratios (LLRs) for a corresponding subset of bit channels of the polar code.

A method of wireless communication is described. The method may include receiving a search space including a set of decoding candidates associated with a polar code, determining a mode for polar detection for the search space, the polar detection being based on composite detection metrics for the set of decoding candidates, where the composite detection metrics are derived from respective subsets of bit metrics for the set of decoding candidates for at least one intermediate polarization layer of the polar code, and performing a list decoding process for at least one of the set of decoding candidates for the search space based on the mode for polar detection for the search space.

An apparatus for wireless communication is described. The apparatus may include a processor, memory in electronic communication with the processor, and instructions stored in the memory. The instructions may be executable by the processor to cause the apparatus to receive a search space including a set of decoding candidates associated with a polar code, determine a mode for polar detection for the search space, the polar detection being based on composite detection metrics for the set of decoding candidates, where the composite detection metrics are derived from respective subsets of bit metrics for the set of decoding candidates for at least one intermediate polarization layer of the polar code, and perform a list decoding process for at least one of the set of decoding candidates for the search space based on the mode for polar detection for the search space.

Another apparatus for wireless communication is described. The apparatus may include means for receiving a search space including a set of decoding candidates associated with a polar code, determining a mode for polar detection for the search space, the polar detection being based on composite detection metrics for the set of decoding candidates, where the composite detection metrics are derived from respective subsets of bit metrics for the set of decoding candidates for at least one intermediate polarization layer of the polar code, and performing a list decoding process for at least one of the set of decoding candidates for the search space based on the mode for polar detection for the search space.

A non-transitory computer-readable medium storing code for wireless communication is described. The code may include instructions executable by a processor to receive a search space including a set of decoding candidates associated with a polar code, determine a mode for polar detection for the search space, the polar detection being based on composite detection metrics for the set of decoding candidates, where the composite detection metrics are derived from respective subsets of bit metrics for the set of decoding candidates for at least one intermediate polarization layer of the polar code, and perform a list decoding process for at least one of the set of decoding candidates for the search space based on the mode for polar detection for the search space.

In some examples of the method, apparatuses, and non-transitory computer-readable medium described herein, determining the mode for polar detection includes selecting a prioritization mode for the polar detection and the performing the list decoding process includes performing the list decoding process over the set of decoding candidates in an order determined based on the polar detection.

In some examples of the method, apparatuses, and non-transitory computer-readable medium described herein, the determining the mode for polar detection includes selecting a qualification mode for the polar detection and the performing the list decoding process includes performing the list decoding process over a subset of the set of decoding candidates determined based on the polar detection.

In some examples of the method, apparatuses, and non-transitory computer-readable medium described herein, the determining the mode for polar detection may be based on a connection state, a signal metric, a device state, a detection history, a communication protocol, or a combination thereof.

DETAILED DESCRIPTION

Figure 1:
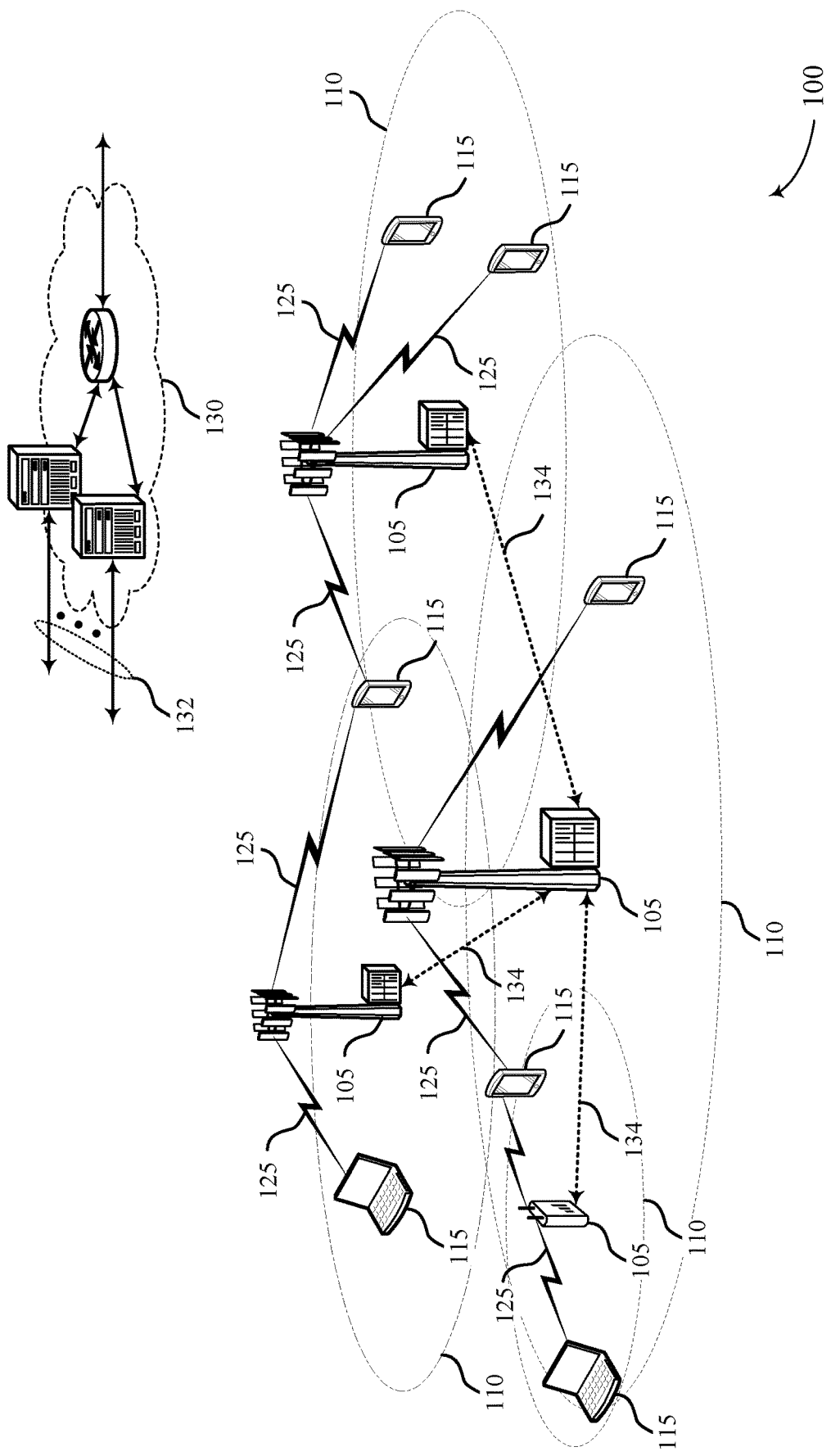
FIGS. 1 and 2 illustrate examples of systems for wireless communications that support efficient polar detection with dynamic control and optimization in accordance with aspects of the present disclosure.

In some wireless systems, a base station or a user equipment (UE) may transmit a payload containing information to be decoded at a receiving device. In some cases, the information may be downlink control information (DCI) carried over a Physical Downlink Control Channel (PDCCH). In some cases, a UE modem in an idle or connected mode may be required to monitor a plurality of blind PDCCH decoding hypothesis (e.g., decoding candidates of a codeword search space) in a time duration, such as a slot. In some cases, such as while operating using multiple carriers (e.g., carrier aggregation (CA) using multiple component carriers (CCs)), the number of required blind PDCCH decodes per slot may also increase. In some cases, UEs may perform brute force decoding for all the blind PDCCH hypotheses, even though a large proportion of the decoding candidates may not correspond with a transmitted PDCCH. In such cases, the percentage of chip-awake time (e.g., in DRX cycle) utilized due to the number of blind decodes may increase.

According to various aspects, a UE decoding a codeword may define one or more types of polar detector components, which may be used to define a generic form for the composition of the decoder. In some cases, three types of detector components may be defined for the F and G blocks as follows: vFn and vGn may be used to refer to F and G vectors, respectively, of derived LLRs for an intermediate decoder layer n (e.g., not the root or leaf layers). In some cases, LLRs for an intermediate decoder layer may be computed using recursions, further described with reference to FIG. 4. Further, it should be noted that the F operations (or single parity check operations) and G operations (or repetition operations) may be represented by the left and right sides of a binary tree while using a binary tree representation for polar decoding. Broadly, the UE decoding the codeword may receive a set of input LLRs (e.g., NLLRs) at the channel or root layer, which may be polarized by the F and G operations at the intermediate layers. In some aspects, each intermediate layer may be associated with a total of NLLRs, where the LLRs may be grouped into one or more subsets by the F and G operations. In some cases, as the decoding proceeds down the binary tree, the one or more subsets of LLRs (or bit metrics) are updated or polarized.

In some cases, estimators sFn and sGn may be used to refer to the scalars of computed estimation metrics, which may be conditioned on certain patterns defined by associated sets of information bits in the blocks. In some cases, estimators dFn_x and dGn_x may represent derived forms of the detector components based on a hypothetical bit pattern for an intermediate decoder layer. In some cases, such derived forms may be defined based on the polar code structure, for example, based on prior knowledge associated with the locations of frozen bits.

In some cases, the decoder composition may be defined using the one or more estimators based on derived values, including vFn, vGn, sFn, sGn, dFn_x and dGn_x, and one or more weighting patterns. In some aspects, the decoder composition may be viewed (or expressed) as a function operating on raw LLRs. In some cases, the decoder composition may also be expressed using LLRs as: $\mathcal{F}\mathrm{dec}(\mathcal{L}0, \mathcal{L}1, \ldots, \mathcal{L}N-1)$, where $\mathcal{L}X$ corresponds to the raw LLR of codeword bit X.

Thus, broadly, a polar detector may be defined to assess the quality of frozen bit components of the polar codeword. For instance, a composite detection metric may be determined for the codeword based on an observed set of log likelihood ratios (LLRs), or bit metrics associated with an intermediate layer of the polar code. In some cases, the composite detection metric may be used to estimate the likelihood of the observed set of LLRs being a polar codeword, or not. In some aspects, the composite detection metric may be defined using one or more estimators, or decoder components, as described above, which are in turn based on derived LLRs.

In some cases, polar detection may be switched on or off, which may be dependent on the mode of operation (e.g., RRC state such as idle state or connected state). In some examples, two operation modes, prioritization (P) and qualification (Q) modes, may be defined for a polar detector. In some cases, the P mode may support prioritization of the list of decoding candidates with a ranking based on estimation metrics (e.g., LLRs). In some aspects, the qualification mode for dynamical control and optimization may enable a polar detector to qualify (or disqualify) decoding candidates via hypothesis testing. In some aspects, the P mode and Q mode may assist in optimizing the overall blind PDCCH decode complexities, for example, while in RRC connected and idle modes, respectively.

Aspects of the disclosure are initially described in the context of a wireless communications system. Aspects of the disclosure are further illustrated by and described with reference to a polar detector structure, decoding process, apparatus diagrams, system diagrams, and flowcharts that relate to efficient polar detection with dynamic control and optimization.

FIG. 1 illustrates an example of a wireless communications system 100 that supports efficient polar detection with dynamic control and optimization in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30{,}720{,}000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some cases, an encoder within a wireless device, such as base station 105 or UE 115 may obtain a codeword from a plurality of information bits as well as one or more frozen bits according to the polar code. In some cases, the codeword may be associated with a Physical Downlink Control Channel (PDCCH) carrying downlink control information (DCI). In some aspects, one or more properties of polar codes may be exploited in order to optimize the number of blind PDCCH decodes in RRC connected and/or idle mode, for instance, while deploying carrier aggregation.

In some cases, a polar detector may be defined to assess the quality of frozen bit components of the polar codeword. For instance, a composite detection metric may be determined for the codeword based on an observed set of log likelihood ratios (LLRs) or bit metrics associated with the polar code. In some cases, the composite detection metric may be used to estimate the likelihood of the observed set of LLRs being a polar codeword, or not. In some aspects, the composite detection metric may be defined using one or more estimators, or decoder components, which are in turn based on derived LLRs.

According to some aspects, the UE 115 may determine whether to switch on polar detection based in part on one or more parameters, including Radio Resource Control (RRC) state (i.e., idle or connected), signal to noise ratio (SNR), prior polar detections, costs (e.g., power), etc. In some examples, a derived threshold for the polar detection feature may be determined using parameter values of prior polar detections and costs. Polar detection may be turned off when detector estimated values fall outside the derived threshold for switching on polar detection. While polar detection is switched on, the UE may further select between different operation modes (e.g., P and/or Q) for dynamic control and optimization of polar detection. In some cases, the P mode may be deployed, such that the polar detector prioritizes the list of decoding candidates with a ranking based on estimation metrics. In some other cases, the Q mode may allow the polar detector to qualify decoding candidates through hypothesis testing.

Figure 2:
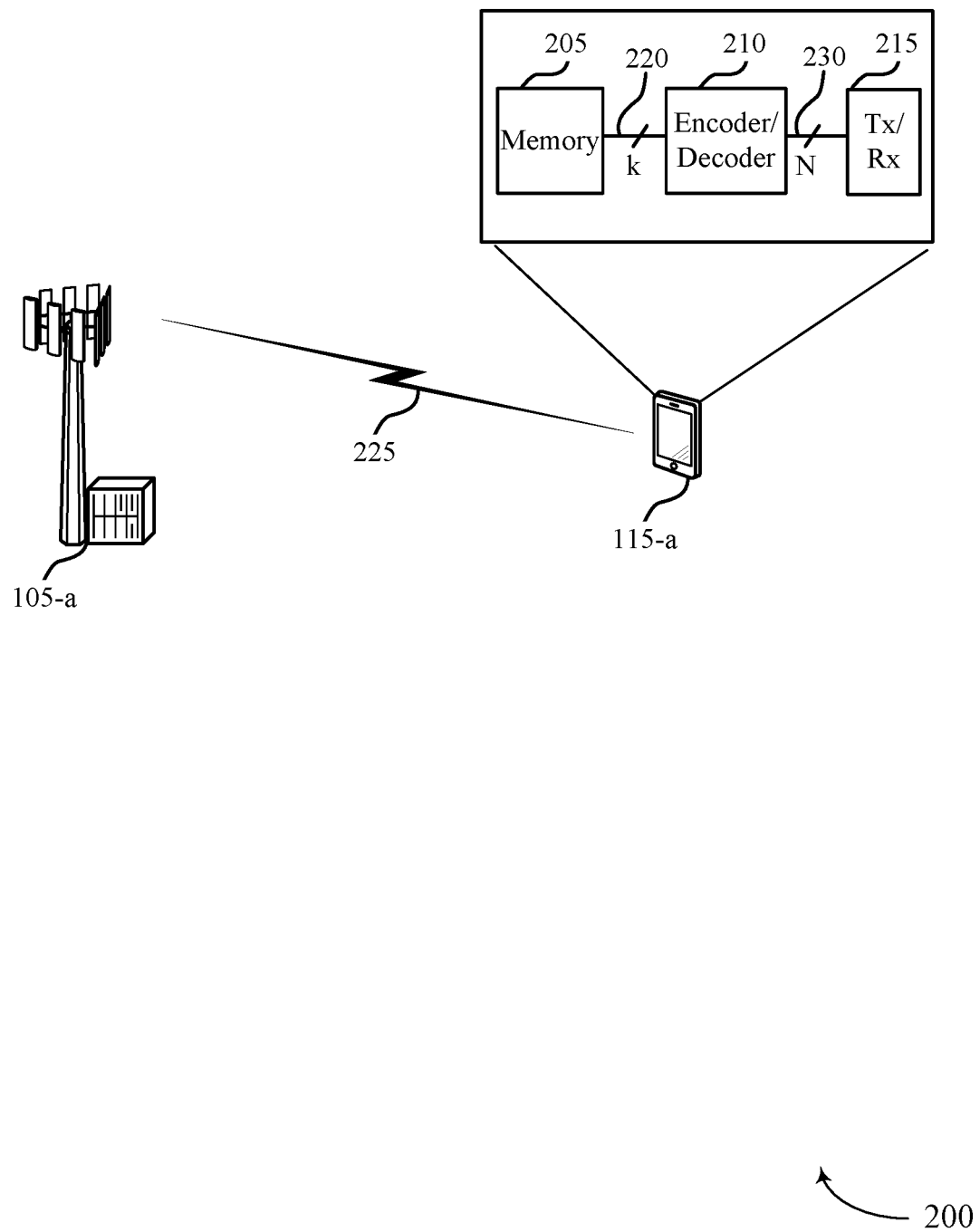

FIG. 2 illustrates an example of a wireless communications system 200 that supports efficient polar detection with dynamic control and optimization in accordance with aspects of the present disclosure. In some examples, wireless communications system 200 may implement aspects of wireless communication system 100, and may include UE 115-a base station 105-a, which may be examples of a UE 115 and a base station 105, as described above with reference to FIG. 1. UE 115-a and base station 105-a may communicate with one another over communication link 225.

As shown, device 200 includes a memory 205, an encoder/decoder 210, and a transmitter/receiver 215. In some cases, a first bus 220 may connect memory 205 to encoder/decoder 210 and a second bus 230 may connect encoder/decoder 210 to transmitter/receiver 215. In some instances, device 200 may have data stored in memory 205 to be transmitted to another device, such as a UE 115 or base station 105. To initiate the transmission process, device 200 may retrieve from memory 205 the data for transmission (e.g., via first bus 220). The number of data bits may be represented as a value 'k,' as shown, and may additionally include error correction bits (e.g., cyclic redundancy check (CRC) bits). The encoder/decoder 210 may encode the number of information bits using a polar code having a length 'N,' which may be different than or the same as 'k.' The polar code may have 'N' bit channels, of which 'k' are information bit channels for mapping of the 'k' data bits. The bit channels that are not allocated as information bits (i.e., N−k bits) may be assigned as frozen bits or parity bits. In some cases, the information bits may be assigned to the k most reliable bit channels, and the frozen bits or parity bits may be assigned to the remaining bit channels. Frozen bits may be bits of a default value (0, 1, etc.) known to both the encoder and decoder (i.e., the encoder encoding information bits at a transmitter and the decoder decoding the codeword received at a receiver). Parity bits may be derived values from one or more information bits. Further, from the receiving device perspective, device 200 may receive encoded data via receiver 215, and decode the encoded data using decoder 210 to obtain the transmitted data (e.g., transmitted by transmitter 215 from a different device 200).

In some wireless systems, decoder 210 may be an example of a successive cancellation (SC) or SC list (SCL) decoder. A UE 115 or base station 105 may receive a transmission including a codeword at receiver 215, and may send the transmission to the SC or SCL decoder (e.g., decoder 210). The decoder 210 may determine input (e.g., unpolarized) LLRs for the bit channels of the received codeword. The decoder 210 may decode the codeword LLRs according to a hypothesis of polar code (e.g., N, k hypothesis), which may be referred to as a decoding candidate. The decoder may perform multiple (e.g., blind) decoding operations on multiple decoding candidates of a codeword search space. During decoding, the decoder 210 may determine decoded LLRs based on these input LLRs, where the decoded LLRs correspond to each polarized bit channel of the polar code. These decoded LLRs may be referred to as bit metrics. In some cases, if the LLR is zero or a positive value, the decoder 210 may determine the corresponding bit is a 0 bit, and a negative LLR may correspond to a 1 bit. The decoder 210 may use the bit metrics to determine the decoded bit values. In some cases, each intermediate layer can be associated with the same number of decoded LLRs as the number of input LLRs (e.g., NLLRs), but they may not be all derived at once. For instance, a subset of bit metrics from an intermediate polarization layer may be used to derive another subset of bit metrics from the same (or a different) layer. Specifically, a first subset of bit metrics (or LLRs) associated with an intermediate polarization layer may get polarized by F and/or G operations, and based on which a next subset of bit metrics for the same or a different intermediate polarization layer may be derived. In some aspects, bit metric or LLR polarization across different intermediate polarization layers may be observed as decoding proceeds down the binary tree.

An SCL decoder may employ multiple concurrent SC decoding processes. Due to the combination of multiple SC decoding processes, the SCL decoder may calculate multiple list candidates for a given decoding candidate. For example, an SCL decoder of list size 'L' (i.e., the SCL decoder performs L SC decoding processes) may calculate L list candidates, and a corresponding reliability metric (e.g., a path metric) for each list candidate. The path metric may represent a reliability of a list candidate or a probability that the corresponding list candidate is the correct set of decoded bits. The path metric may be based on the determined bit metrics and the bit values selected at each bit channel. The SCL decoder may have a number of levels equal to the number of bit channels in the received codeword. At each level, the L list candidates may each be extended with a 0 and a 1 value to generate 2L list candidates. A new set of L list candidates may be selected from the 2L list candidates based on path metrics. For example, the SCL decoder may select the list candidates with the highest path metrics.

Each SC decoding process may decode the codeword sequentially (e.g., in order of the bit channel indices) due to LLR derivation dependencies. That is, because the first bit channel depends on the input LLRs and no decoded bits, each SC decoding process may first decode the bit corresponding to the first bit channel. Decoding bits for each following bit channel depends on feedback of previously decoded bits. For example, decoding the bit for the second bit channel depends on feedback from decoding the first bit channel, decoding the bit for the third bit channel depends on feedback from decoding the first and second bit channels, etc. In this way, information encoded in bit channels with lower indices may be decoded earlier than information encoded in bit channels with higher indices based on the sequential nature of SC polar decoding. Thus, in some aspects, the soft values received from the channel and the internally exchanged information within the decoder may be considered to be LLRs. Further, at each stage in a binary tree, the LLR values may be sent from a parent node to a child node (i.e., upper layer to lower layer), while hard decision values may go up in layer.

In some cases, a polar detector may be defined comprising one or more types of detector components defined as follows: vFn and vGn may be used to refer to F and G vectors, respectively, of derived LLRs for an intermediate decoder layer n (e.g., not the root or leaf layers). In some cases, a composite detection metric may be determined for the codeword for the decoding candidate based on a subset of bit metrics for an intermediate polarization layer of the polar code. For instance, the composite detection metric may be determined by applying a weighting vector to the subset of bit metrics. In some other cases, the composite detection metric may be determined using a linear combination of the subset of bit metrics. In some cases, the composite detection metric may be determined from derived bit metrics, which may be based at least in part on the subset of bit metrics and a weighting pattern. In some cases, the weighting pattern may be determined based at least in part on a number of information bits in a subset of leaf nodes corresponding to the subset of bit metrics.

In some cases, the composite detection metric may be determined from one or more intermediate metric computations. In some aspects, the process for determining the composite detection metric may involve the use of a weighted combination of a subset of bit metrics, followed by one or more activation operations. In some cases, machine learning techniques (e.g., through the use of artificial neural networks) may be deployed for determining the composite detection metric. In some cases, artificial neural networks may utilize activation functions (or operations) for determining how relevant (or irrelevant) the information that an artificial neuron (i.e., a mathematical function conceived as a neuron) receives. Further, in some examples, the activation operation may involve the use of a non-linear transformation. Thus, in some aspects, the composite detection metric may broadly be viewed as a combination of one or more weighting vectors applied to a subset of bit metrics, where the combination of the weighted bit metrics may be updated through the use of the activation functions. In some cases, the use of a non-linear function instead of a linear function may allow for back-propagation (i.e., updating weights based on an error), which may serve to improve decoder and/or detector performance. In some other cases, the composite detection metric may be viewed as a weighted combination of one or more subsets of bit metrics (e.g., a first subset of bit metrics associated with a first intermediate polarization layer of the polar code, a second subset of bit metrics associated with a second intermediate polarization layer, and so on), where the individual weights (or weighting vectors) may be updated via the activation functions.

In some cases, the weighting vectors used to compute the composite detection metric may be indicated to the UE 115-*a* by the base station 105-*a*, where the weighting vectors may be updated (e.g., from one codeword to the next) by an activation function utilized at the base station. In some cases, the activation function may adjust the weighting vectors based on, for example, feedback related to decoding performance experienced at the UE 115-*a*. In some other cases, the UE 115-*a* may feed information related to its decoding performance (e.g., most recent, or a history), in order to teach the activation function to make more informed decisions for determining the weights (or weighting vectors).

In some cases, the proposed estimators of a polar detector may be defined using: vF128, vF64, vF32, vF16, vG16, etc., which are the vectors of derived LLRs associated with the F or G referenced blocks in the vector structure. For instance, vF32 may be the vector comprising 32 derived LLRs associated with a block F32. Similarly, in some cases, sF64, sF32, etc. may be used to refer to the scalars of computed estimation metrics, which may be conditioned on certain patterns defined by an associated set of information bits for the block. For instance, the estimator, $sF64=\Sigma_i$ (elem$_i$ in vF64).

The patterns may be selected based on a number of information bits in the block. For example, for a block F16 having two information bits, dF16a and dF16b may be represented as: $dF16\_a=|Q_{even}+Q_{odd}|$ and $dF16\_b=|Q_{even}-Q_{odd}|$, where: $Q_{even}=\Sigma_{i\ even}$(elem$_i$ in vF16) and $Q_{odd}=\Sigma_{i\ odd}$(elem$_i$ in vF16).

In some cases, polar detection may be performed using one or more combinations of the proposed estimators, as further described with reference to FIG. 3.

In some cases, the decoder composition may be defined using the one or more estimators based on derived values, including vFn, vGn, sFn, sGn, dFn_x and dGn_x, and one or more weighting patterns. For instance, the decoder composition may be defined as: $w_0*vFn+w_1*vGn+w_2*sFn+w_3*sGn+w_4*dFn\_x+w_5*dGn\_x$, where the weights $w_i$, $i\in\{0, 1, \ldots\}$ may be predetermined (e.g., statically). In some cases, one or more optimization techniques may be used to determine the associated weights for the decoder composition. For instance, the weighting patterns may be based in part on a number of information bits in a subset of leaf nodes (i.e., lowest layer) corresponding to a particular block. In some aspects, the decoder composition may be viewed (or expressed) as a function operating on raw LLRs, and the derived LLRs may be based at least in part on the subset of raw LLRs and a weighting pattern. In some cases, the decoder composition may also be expressed using LLRs as: $\mathcal{F}$ dec ($\mathcal{L}0, \mathcal{L}1, \ldots, \mathcal{L}N-1$).

In some cases, the decoder composition may also be expressed using a combination of signed and unsigned vectors and scalars. In one example, the decoder composition may be expressed by:

$$\text{Fdec} = \Sigma i \in \text{SET}\{vF_i\} W_{vFi} * vF_i + \\ \Sigma i \in \text{SET}\{vG_i\} W_{vGi} * vG_i + \Sigma i \in \text{SET}\{sF_i\} w_{sFi} * sF_i + \\ \Sigma i \in \text{SET}\{sG_i\} w_{sGi} * sG_i + \Sigma i \in \text{SET}\{dF_i\} w_{dFi} * dF_i + \\ \Sigma i \in \text{SET}\{dG_i\} w_{dGi} * dG_i,$$

where $W_{vFi}$ and $W_{vGi}$ are unsigned row vectors; $vF_i$ and $vG_i$ are signed column vectors; $w_{sFi}$, $W_{sGi}$, $W_{dFi}$, and $W_{dGi}$ are unsigned scalars; and $sF_i$, $sG_i$, $dF_i$, $dG_i$ are signed scalars.

In some cases, decoder composition may be defined using different weighting vectors applied to different subsets of bit metrics across one or more polarization layers of the polar code. Further, the weighting vectors (or weights) may be updated based on applying one more activation functions. For example, the composite detection metric may be expressed as a combination of weighted first and second subsets of bit metrics associated with first and second intermediate polarization layers of the polar code. In some cases, the weighted first and second subsets of bit metrics may be obtained by applying first and second weighting vectors to the subsets of bit metrics. Further, the composite detection metric may be determined by applying one or more activation functions for combining the weighted first and second subsets of bit metrics, where the influence of each of the weighted subsets on the composite metric may be controlled using the activation function.

In some examples, in order to support dynamic control and optimization, performance for a polar detector may be derived through a weighted combination of errors. Further, an optimal performance threshold may be computed based on one or more factors such as type of deployment (low latency or mobile broadband) and/or RRC state. In some cases, the performance of dynamic thresholding control for polar decoding may be based on the detector composition, on the type of conditioned errors P(H0|H1) and P(H1|H0), or a combination. It should be noted that hypothesis H0 may be associated with a signal not having a valid polar structure, whereas H1 may be associated with a signal having a valid polar structure. Thus, P(H0|H1) may be the probability of not detecting a polar structure when the associated decoding candidate corresponds to a polar codeword (i.e., missed detection), while P(H1|H0) may be the probability of detecting a polar structure when the associated decoding candidate does not correspond to a polar codeword (i.e., false alarm).

In some cases, a descrambled signal without a valid polar structure may be due to the use of an invalid polar codeword (e.g., due to mismatching blind hypothesis, or no polar signal). In some other cases, the invalid polar structure may be due to applying a valid codeword with mismatching sequences to the signal (e.g., during scrambling and/or descrambling). In some cases, the parameters for prior detections of polar encoded codewords (e.g., R0 and R1), and cost of errors (e.g., C01 and C10) may be based in part on dynamic operations, such as an operation mode (e.g., idle or connected, eMBB or mMTC, etc.). Thus, a total cost of error $C_{err}$ may be defined as: $C_{err} = P_{01} * R_1 * C_{01} + P_{10} * R_0 * C_{10}$. In some aspects, different operation modes may utilize different weightings for false alarms and/or missed detections. In such cases, there may be different targeted operation points (i.e., for switching between on and off) for the different modes. In some aspects, the values of $R_{ij}$, and $C_{ij}$ (i.e., prior polar detections and cost of errors) may be based on operation modes for optimal decisions, such as idle or connected state, eMBB or mMTC transmission protocol, etc. In some examples, an outer loop logic may also be deployed concurrently with selection of parameter values.

In some cases, the deployment of a polar detection feature may be toggled between on and off, and may be dependent on the mode of operation. In one example, the polar detection feature may be turned off when specific parameter values of prior polar detections and costs result in a derived threshold that falls outside of the range of the detector estimated values.

In some examples, two operation modes, P and Q modes, may be defined for the polar detector. In some cases, the modes may be deployed based on switching on polar detection features. In some cases, the P mode may support prioritization of the list of decoding candidates with a ranking based on estimation metrics (e.g., LLRs). In some cases, determining the mode for polar detection may comprise selecting a qualification mode for the polar detection. In some aspects, the qualification mode for dynamical control and optimization may enable a polar detector to qualify (or disqualify) decoding candidates via hypothesis testing. In some aspects, the P mode or Q mode may assist in optimizing the overall blind PDCCH decode complexities, for example, while in RRC connected and idle states, respectively.

Figure 3:
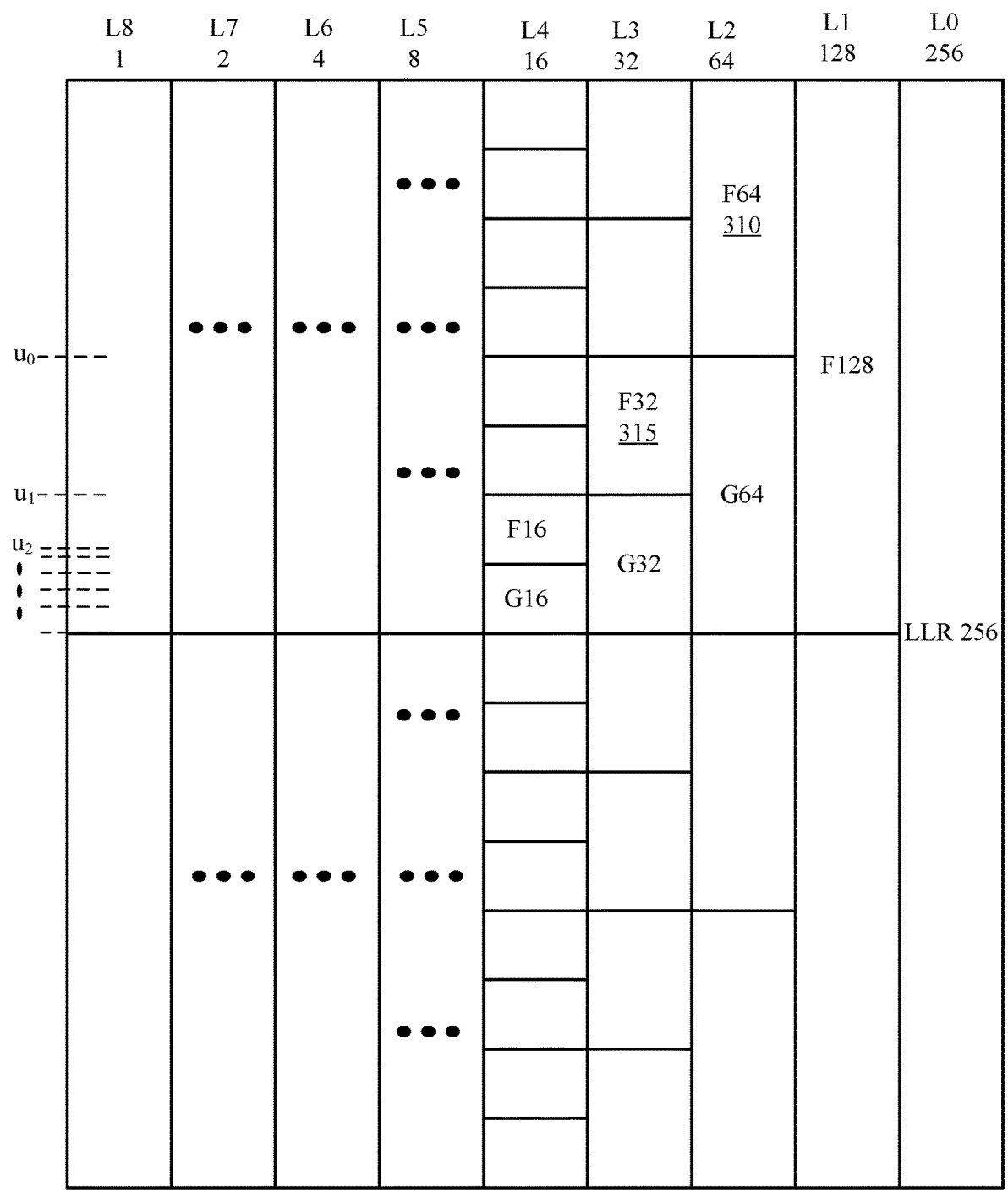
FIG. 3 illustrates an example of a polar detector that supports efficient polar detection with dynamic control and optimization in accordance with aspects of the present disclosure.

FIG. 3 illustrates an example of a polar detector structure 300 that supports efficient polar detection with dynamic control and optimization in accordance with aspects of the present disclosure. In some examples, polar detector structure 300 may be implemented by aspects of wireless communication systems 100 and/or 200. In some cases, polar detector structure 300 may be represented using one or more proposed estimators, as discussed above with reference to FIG. 2. In some cases, the encoder at the transmitting end may identify a default value of information bits, K, and total bits, N, to use in encoding a codeword. In some examples, the codeword may be a polar codeword. In this example, N may be 256 (i.e., $2^n$, where n=8).

As shown, a wireless device (e.g., UE) may receive encoded data via a receiver. Further, the UE may perform one or more polar detection and decoding techniques to determine the decoded bit values. For instance, the decoder in the UE may determine input (e.g., unpolarized) LLRs for the bit channels of the received codeword. During decoding (e.g., SC or SCL decoding), the decoder may determine decoded LLRs based on these input LLRs and feedback bits from the SC or SCL decoding, where the decoded LLRs correspond to each polarized bit channel of the polar code. In some cases, these decoded LLRs may be referred to as bit metrics. In some cases, if the LLR is zero or a positive value, the decoder may determine the corresponding bit is a 0 bit, and a negative LLR may correspond to a 1 bit. In some examples, the decoder may use the bit metrics to determine the decoded bit values.

In some cases, SC decoding process may decode the codeword sequentially (e.g., in order of the bit channel indices) due to LLR derivation dependencies. That is, because the first bit channel depends on the input LLRs and no decoded bits, each SC decoding process may first decode the bit corresponding to the first bit channel. Decoding bits for each following bit channel depends on feedback of previously decoded bits. For example, decoding the bit for the second bit channel depends on feedback from decoding the first bit channel, decoding the bit for the third bit channel depends on feedback from the first and second bit channels, etc.

In some cases, and as illustrated in FIG. 3, L0 (256)-L8 (1) may represent the LLRs at a particular stage (or layer), where, in the illustrated example, L0 comprises the 256 channel LLRs of the codeword. In this example, the 256 LLRs (i.e., unpolarized LLRs) at the channel layer (L0) may also be referred to as a set of received bit metrics. Further, the decoded LLRs at the intermediate polarization layers (e.g., layers L1-L7) may be grouped into different subsets of LLRs, where the total number of decoded LLRs at any layer may not exceed 256. In some aspects, the LLRs for intermediate polarization layers may be polarized based on F and G operations.

In some cases, polar encoding may be performed using one or more XOR'ing operations. Additionally, the structure of the polar code may result in directionality for the XOR operations, meaning that a given codeword bit may only depend on bits that are higher in the decoding order.

In some aspects, a polar code may be identified based at least in part on determining if a positive coherent combination property is satisfied. In some cases, the LLRs may be used to determine if the property is satisfied. In some aspects, if the mean of LLRs is strongly positive or negative (i.e., larger mean), it may signify a polar code, and a more reliable bit channel. In some other cases, a mean closer to zero may indicate noise, due to the minimal consistency of decoded bits.

In some cases, a composition metric may be derived based in part on the LLRs. For instance, estimators may be defined using N LLRs of the (N,k) polar code. In some cases, the polar detector structure 300 may be based on a binary tree, where each branch in the tree may represent an F or G operation. In some examples, F operations may be illustrated as traversing towards the top of the page in FIG. 3, while G operations may be illustrated as traversing towards the bottom of the page in FIG. 3. In some examples, polar detection using estimators may comprise performing F operations until a predetermined number of information bits are encountered. As shown, the UE may perform the F operations until the first information bit $u_0$ is located, which in the illustrated example corresponds to F64 310. In some other cases, the UE may traverse the F tree until a F block is reached with no information bits or more than one information bit. In some aspects, the decoder may only need to reach an intermediate decoding layer (e.g., may not need to reach the leaf layer) based on the frozen bit distribution or an assumed pattern for frozen and information bits. For example, given a known frozen bit distribution, coherent combination may be performed on the proposed estimator F64 without traversing to the leaf layer. In some cases, sF64 may be determined based on the elements in vF64 (i.e., vector of derived LLRs associated with block F64). In some cases, the elements of vF64 may provide insight on whether the codeword is likely to be a polar codeword. For instance, polar codes may satisfy coherent combination properties, whereas additive white gaussian noise (AWGN) may not.

Additionally or alternatively, other estimators may be used. For example, sF32 may be used as a component estimator for detecting a polar structure, where sF32 corresponds to F32 block 315 that is a child node of a G node (e.g., G64) and does not include any information bits. That is, even after a first estimator for a node having one or more information bits, additional estimators may be used for other nodes having a predetermined number (e.g., none, 1, 2, etc.) of information bits. In some aspects, the use of sF32 as an estimator may vary from sF64, due to the feedback of an information bit via a G node. In some cases, the hard value of the first information bit $u_0$ may be feedback until L2 64. The LLRs of G64, including their composite sign may be dependent on the feedback bit. In some cases, coherent combination properties may still hold (i.e., if a polar code), and absolute values of LLRs from vF32 may be used to determine sF32 according to the definitions described above. In such cases, the absolute value of sF32 may be compared against a zero-mean sum.

In some other cases, an opportunistic or hypothetical approach may be used. In this example, since the first information bit $u_0$ may only take on one of two possible bit values (i.e., 0 or 1), two quantities may be derived for sF32, based on which polar detection may be performed. Specifically, the LLRs of G64 may be computed for the first information bit being 1 and 0, based on which the LLRs of F32 may be computed. In some cases, if the two scalar quantities computed from the different bit values are approximately zero (i.e., zero like), the UE may determine that there is a low likelihood of the codeword being a polar encoded codeword. Conversely, if at least one of the two scalar quantities is strongly positive (i.e., large amplitude), the codeword may be detected to be a polar encoded codeword.

In some cases, the F32 block may also include one information bit $u_1$. In this case, the second information bit $u_1$ may be determined, based on the LLRs in F32 and the possibilities of the information bit being 1 or 0. That is, there may be four estimator quantities for vF32 or sF32 that correspond to polar encoded codewords. Alternatively, the next information bit $u_1$ may be in block F16 as illustrated in FIG. 3. In the illustrated example, block F16 may have two information bits associated with it. In such cases, the two information bits may be computed, fed back to compute the LLRs of G32, and based on which the LLRs of F16 may be derived. In an alternate technique, since the two information bits associated with F16 may only take on 4 possible patterns (i.e., 00, 01, 10, 11), four estimator quantities may be determined for the 4 patterns.

Figure 4:
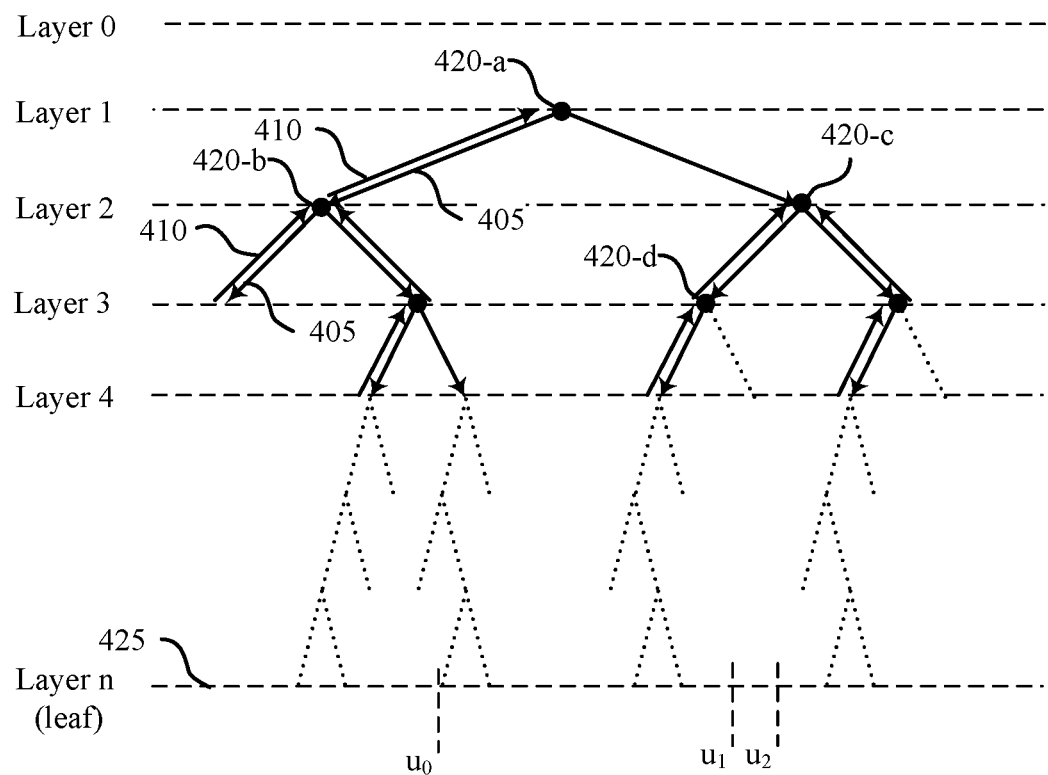
FIG. 4 illustrates an example of a decoding process in accordance with aspects of the present disclosure.

FIG. 4 illustrates an example of a decoding process 400 that supports efficient polar detection in accordance with various aspects of the present disclosure. In some examples, the decoding process 400 may be implemented by aspects of wireless communication system 100. The decoding process 400 may be performed by a base station 105, a UE 115, or a device 200 as described with reference to FIGS. 1 and 2. The decoding process 400 may be represented by a binary tree, where each branch in the tree represents a F or G operation.

In some cases, the leaf nodes (not shown) may be the N hard bits to be sequentially decoded, and soft information (e.g., LLRs) about the received vector may be input at the node 420-a. In the illustrated example, node 420-a is associated with layer 1, which corresponds with F128 for decoding of the polar code. In some cases, soft values received from the channel and internally exchanged information within the decoder may be considered to be LLRs. At each stage, the LLR values 405 may be sent from the parent node (e.g., node 420-a) to the child nodes at lower layers, while hard decision values 410 may be fed back from the child nodes to the parent nodes.

As shown in FIG. 4, decoding process 400 may pertain to intermediate decoding layers associated with an estimator.

For example, decoding process 400 illustrates estimators F64 and G64 (nodes 420-b and 420-c of Layer 2). In some cases, the LLRs associated with an intermediate layer may be passed down from the parent node (e.g., node 420-a) to the child node (e.g., node 420-b). In some cases, the LLR vector going to the left child node (i.e., vF) and the one going to the right child node (vG) may be computed using the equations below:

$$F(a,b) = sgn(a)*sgn(b)*\min(|a||b|), \text{ and}$$

$$G(a,b) = a+b, \text{ if } F(a,b) > 0,$$

$$-a+b, \text{ if } F(a,b) < 0$$

Where, 'a' and 'b' may represent components of vectors of the LLRs at a given layer.

In this example, the LLRs associated with estimator F128 may be passed on to F64. In some cases, when a leaf node is reached (i.e., node in leaf layer 425), the $i^{th}$ hard decision value may be set as the estimated bit $u_i$.

Thus, in some aspects, the LLR vector sent to the left child node may be computed through the F operation or function, while the LLR vector directed to the right child node may be calculated through the G operation or function. In some aspects, the exploration of the binary tree in decoding process 400 tree may be viewed as a sequence of F and G operations.

In some cases, based on the frozen bit pattern (i.e., the location of the first information bit $u_0$), coherent combination may be performed on the estimator without traversing to the leaf layer. In some examples, polar detection using estimators may comprise performing F operations until a predetermined number of information bits are encountered. As shown, the UE may perform the F operations until the first information bit $u_0$ is located. In some other cases, the UE may traverse the F tree until an F block is reached with no information bits.

In one example, the first information bit $u_0$ may be estimated as 0 or 1, based on which the LLRs of G64 may be computed (e.g., according to each hypothesis). For instance, the LLRs input into node 420-c may be computed based on opportunistic or hypothetical hard decision 410 feedback from layer 2 to layer 1. Further, the LLR vectors vF32 may be determined from the LLRs of G64 (e.g., according to each hypothesis for information bit $u_0$), from which the scalar sF32 may be determined. For instance, absolute values of elements of one or more vectors vF32 may be summed to determine one or more values for sF32. In some cases, if sF32 is strongly positive (or negative), the codeword may be determined to be a polar encoded codeword. In some other case, if sF32 is close to zero, the codeword may be determined not to be a polar encoded codeword.

As discussed above, the scalars sFN, sGN, dFN, or dGN may be conditioned on certain patterns defined by an associated set of information bits for the block. For instance, the estimator, $sF64=\Sigma_i(elem_i \text{ in } vF64)$. If, for example, an F16 block has two information bits, dF16a and dF16b may be represented as: $dF16\_a=|Q_{even}+Q_{odd}|$ and $dF16\_b=|Q_{even}-Q_{odd}|$, where: $Q_{even}=\Sigma_{i\ even}(elem_i \text{ in } vF16)$ and $Q_{odd}=\Sigma_{i\ odd}(elem_i \text{ in } vF16)$.

Although discussed as estimators for intermediate layers without traversing to the leaf layer, one of skill in the art would understand how to implement similar techniques while traversing to the leaf layer, with feedback representing hard decisions of feedback bits for each list candidate of an SCL decoder implemented at the leaf layer.

In some aspects, analyzing LLRs at a non-leaf layer within a binary tree for polar decoding may be used to inform P and Q operation modes, as further described with reference to FIG. 5. In some cases, taking one or more metrics of LLRs at intermediate layers may provide insight into early termination of decoding. In some aspects, early termination using a list approach may rely on normalization, which may be optimized using the techniques described herein. For instance, as each bit is decoded in F64, it may contribute differently for computation of the LLRs in G64. In such cases, a common factor may be used to scale the LLRs. In some cases, normalization may have adverse impacts on the qualification and disqualification results for candidate paths.

Figure 5:
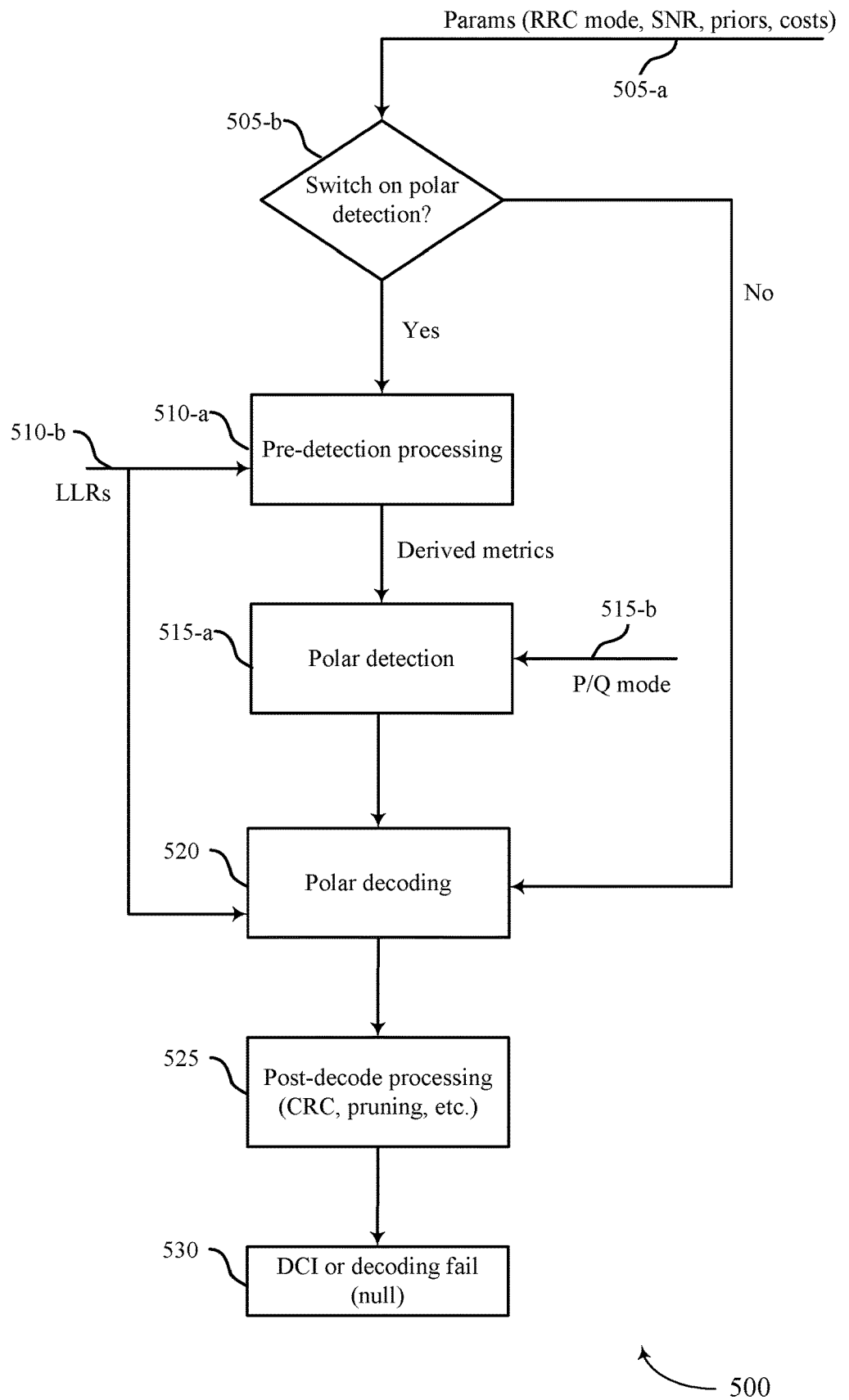
FIG. 5 illustrates an example of a flowchart that supports efficient polar detection with dynamic control and optimization in accordance with aspects of the present disclosure.

FIG. 5 illustrates an example of a flowchart 500 that supports efficient polar detection with dynamic control and optimization in accordance with aspects of the present disclosure. In some examples, flowchart 500 may implement aspects of wireless communication systems 100 and/or 200.

As shown, at 505-a, the decoder in a wireless device, such as a UE, may determine one or more parameters such as RRC state (e.g., idle or connected), SNR, prior polar detections, costs of errors which may be used for dynamic control and optimization for polar detection.

At 505-b, the decoder may determine whether polar detection may be switched on, based in part on the parameters received in 505-a. If yes, the decoder may proceed to start pre-detection processing at 510-a. In some cases, polar detection may not be switched on, and the decoder may proceed to polar decoding at 520.

In some cases, one or more LLRs (soft values) may be identified and passed on at 510-b. In some cases, if polar detection is switched on, one or more derived metrics (i.e., derived LLRs) computed or estimated from the raw LLRs may be passed on for polar detection at 515-a.

In some cases, at 515-b, an operation mode (P or Q) may be selected to control polar detection. As previously described, the P mode may enable the polar detector to prioritize the list of decoding candidates with a ranking or via estimation metrics. In some other cases, the Q mode may enable the polar detector to qualify candidates through hypothesis testing. Selection of P mode or Q mode may be dependent on multiple factors, including at least RRC state. In some examples, both P mode and Q mode may be enabled, with qualified candidates prioritized by the polar detector.

At 515-a, polar detection may be performed, which may include assessing the quality of the frozen bit components of the codeword, in order to estimate the likelihood of the observed set of LLRs being a polar codeword or not. Further, polar detection may include determining a list of decoding candidates and priority ranks for the decoding candidates.

At 520, the decoder may perform polar decoding, based in part on the inputs received from 515-a (i.e., list of decoding candidates, etc.) and the LLRs from 510-b.

At 525, the decoder may perform post-decode processing based on the decoded bits for the list of hypothesis received from 520. In some cases, post-decode processing may comprise at least an error checking process (e.g., using CRC bits) and pruning of decoding candidate paths (i.e., SCL decoder).

At 530, the decoder may determine the information bits of the codeword (e.g., DCI within a codeword search space), or declare a decoding fail (i.e., null) based on the post-decode processing.

Figure 6:
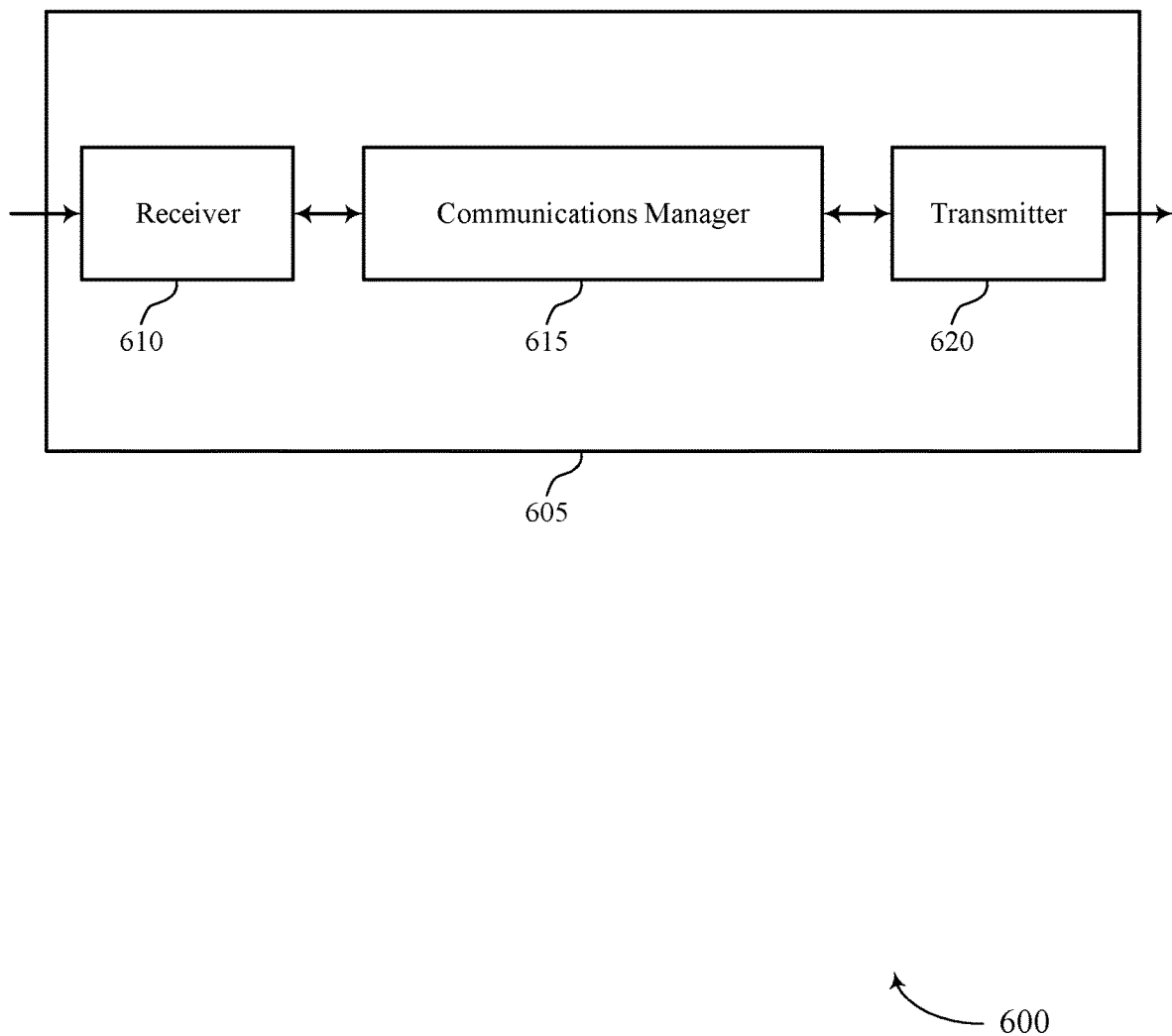
FIGS. 6 and 7 show block diagrams of devices that support efficient polar detection with dynamic control and optimization in accordance with aspects of the present disclosure.

FIG. 6 shows a block diagram 600 of a device 605 that supports efficient polar detection with dynamic control and optimization in accordance with aspects of the present disclosure. The device 605 may be an example of aspects of a UE 115 or base station 105 as described herein. The device 605 may include a receiver 610, a communications manager 615, and a transmitter 620. The device 605 may also include a processor. Each of these components may be in communication with one another (e.g., via one or more buses).

Receiver 610 may receive information such as packets, user data, or control information associated with various information channels (e.g., control channels, data channels, and information related to efficient polar detection with dynamic control and optimization, etc.). Information may be passed on to other components of the device 605. The receiver 610 may be an example of aspects of the transceiver 920 or 1020 as described with reference to FIGS. 9 and 10. The receiver 610 may utilize a single antenna or a set of antennas.

The communications manager 615 may monitor for a decoding candidate of a codeword, where the codeword corresponds to a set of received bit metrics, and the decoding candidate corresponds to a set of information bits encoded using a polar code, determine a composite detection metric for the codeword for the decoding candidate, where the composite detection metric is derived from a first subset of bit metrics for an intermediate polarization layer of the polar code, and determine a classification for performing a list decoding process on the codeword according to the decoding candidate based on the composite detection metric.

The communications manager 615 may also be configured to monitor a codeword search space including a set of decoding candidates associated with a polar code, determine a mode for polar detection for the search space, the polar detection being based on composite detection metrics for the set of decoding candidates, where the composite detection metrics are derived from respective subsets of bit metrics for the set of decoding candidates for at least one intermediate polarization layer of the polar code, and perform a list decoding process for at least one of the set of decoding candidates for the search space based on the mode for polar detection for the search space. The communications manager 615 may identify one or more list candidates for the at least one of the set of decoding candidates from the list decoding process, and a set of data bits may be obtained based on an error checking process (e.g., for a list candidate having a passing CRC). The communications manager 615 may be an example of aspects of the communications manager 910 or 1010 as described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 620 may transmit signals generated by other components of the device 605. In some examples, the transmitter 620 may be collocated with a receiver 610 in a transceiver module. For example, the transmitter 620 may be an example of aspects of the transceiver 920 or 1020 as described with reference to FIGS. 9 and 10. The transmitter 620 may utilize a single antenna or a set of antennas.

Figure 7:
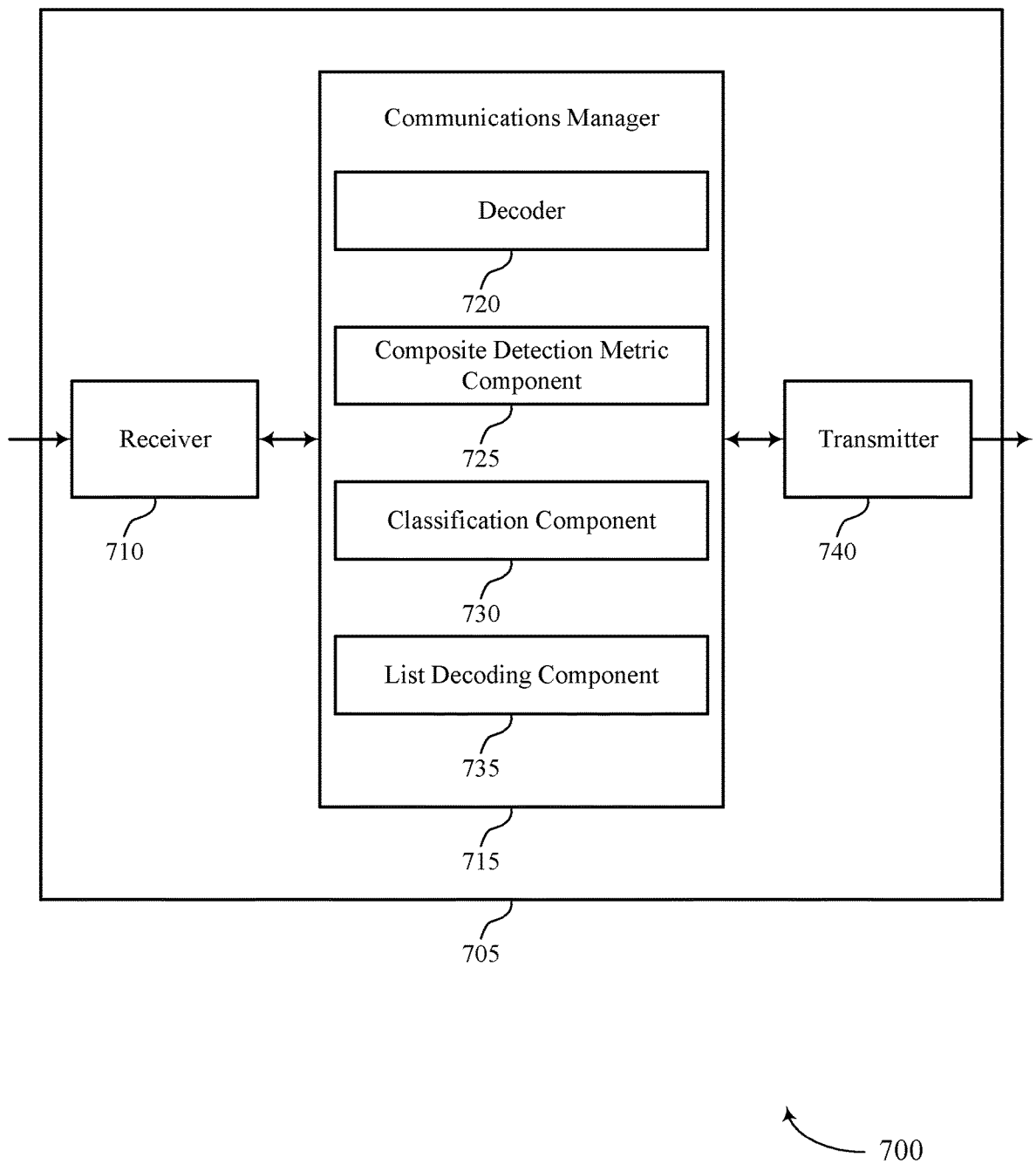

FIG. 7 shows a block diagram 700 of a device 705 that supports efficient polar detection with dynamic control and optimization in accordance with aspects of the present disclosure. The device 705 may be an example of aspects of a device 605, a UE 115, or a base station 105 as described herein. The device 705 may include a receiver 710, a communications manager 715, and a transmitter 740. The device 705 may also include a processor. Each of these components may be in communication with one another (e.g., via one or more buses).

Receiver 710 may receive information such as packets, user data, or control information associated with various information channels (e.g., control channels, data channels, and information related to efficient polar detection with dynamic control and optimization, etc.). Information may be passed on to other components of the device 705. The receiver 710 may be an example of aspects of the transceiver 920 or 1020 as described with reference to FIGS. 9 and 10. The receiver 710 may utilize a single antenna or a set of antennas.

The communications manager 715 may be an example of aspects of the communications manager 615 as described herein. The communications manager 715 may include a decoder 720, a composite detection metric component 725, a classification component 730, and a list decoding component 735. The communications manager 715 may be an example of aspects of the communications manager 910 or 1010 as described herein.

The decoder 720 may monitor for a decoding candidate of a codeword, where the codeword corresponds to a set of received bit metrics, and the decoding candidate corresponds to a set of information bits encoded using a polar code.

The composite detection metric component 725 may determine a composite detection metric for the codeword for the decoding candidate, where the composite detection metric is derived from a first subset of bit metrics for an intermediate polarization layer of the polar code.

The classification component 730 may determine a classification for performing a list decoding process on the codeword according to the decoding candidate based on the composite detection metric.

The decoder 720 may receive a search space including a set of decoding candidates associated with a polar code.

The composite detection metric component 725 may determine a mode for polar detection for the search space, the polar detection being based on composite detection metrics for the set of decoding candidates, where the composite detection metrics are derived from respective subsets of bit metrics for the set of decoding candidates for at least one intermediate polarization layer of the polar code.

The list decoding component 735 may perform a list decoding process for at least one of the set of decoding candidates for the search space based on the mode for polar detection for the search space.

Transmitter 740 may transmit signals generated by other components of the device 705. In some examples, the transmitter 740 may be collocated with a receiver 710 in a transceiver module. For example, the transmitter 740 may be an example of aspects of the transceiver 920 or 1020 as described with reference to FIGS. 9 and 10. The transmitter 740 may utilize a single antenna or a set of antennas.

Figure 8:
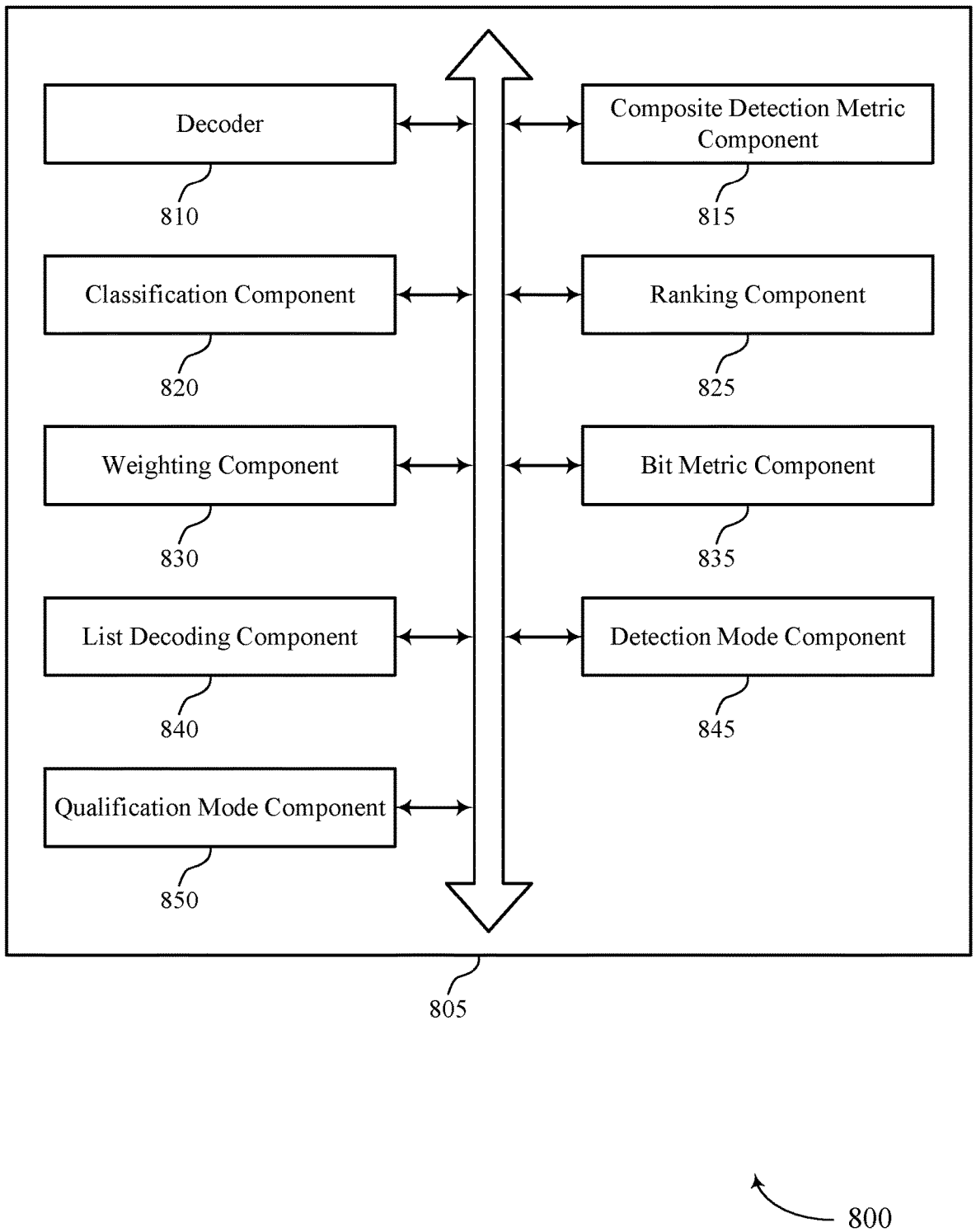
FIG. 8 shows a block diagram of a communications manager that supports efficient polar detection with dynamic control and optimization in accordance with aspects of the present disclosure.

FIG. 8 shows a block diagram 800 of a communications manager 805 that supports efficient polar detection with dynamic control and optimization in accordance with aspects of the present disclosure. The communications manager 805 may be an example of aspects of a communications manager 615, a communications manager 715, or a communications manager 910 described herein. The communications manager 805 may include a decoder 810, a composite detection metric component 815, a classification component 820, a ranking component 825, a weighting component 830, a bit metric component 835, a list decoding component 840, a detection mode component 845, and a qualification mode component 850. Each of these modules may communicate, directly or indirectly, with one another (e.g., via one or more buses).

The decoder 810 may monitor for a decoding candidate of a codeword, where the codeword corresponds to a set of received bit metrics, and the decoding candidate corresponds to a set of information bits encoded using a polar code.

In some examples, the decoder 810 may receive a search space including a set of decoding candidates associated with a polar code.

The composite detection metric component 815 may determine a composite detection metric for the codeword for the decoding candidate, where the composite detection metric is derived from a first subset of bit metrics for a first intermediate polarization layer of the polar code.

In some examples, the composite detection metric component 815 may determine a mode for polar detection for the search space, the polar detection being based on composite detection metrics for the set of decoding candidates, where the composite detection metrics are derived from respective subsets of bit metrics for the set of decoding candidates for at least one intermediate polarization layer of the polar code.

The classification component 820 may determine a classification for performing a list decoding process on the codeword according to the decoding candidate based on the composite detection metric.

In some examples, the classification component 820 may determine to suppress the list decoding process for the decoding candidate.

In some examples, the classification component 820 may compare the composite detection metric to a threshold, where the threshold is based on a connection state, a signal metric, a device state, a detection history, a communication protocol, or a combination thereof.

The list decoding component 840 may perform a list decoding process for at least one of the set of decoding candidates for the search space based on the mode for polar detection for the search space.

In some cases, the performing the list decoding process includes performing the list decoding process over the set of decoding candidates in an order determined based on the polar detection.

In some cases, the performing the list decoding process includes performing the list decoding process over a subset of the set of decoding candidates determined based on the polar detection.

The ranking component 825 may determine a ranking for performing the list decoding process on the codeword according to the decoding candidate relative to other decoding candidates of a set of decoding candidates for a codeword search space.

The weighting component 830 may apply a weighting vector to the first subset of bit metrics. In some examples, the weighting component 830 may also apply a second weighting vector to a second subset of bit metrics associated with a second intermediate polarization layer of the polar code.

In some examples, the weighting component 830 may apply one or weighting vectors to the first subset of bit metrics to obtain one or more intermediate composite metrics.

The bit metric component 835 may determine derived bit metrics based on the subset of bit metrics and a weighting pattern, the weighting pattern determined based on a number of information bits in a subset of leaf nodes corresponding to the subset of bit metrics. In some cases, the bit metric component 835 may apply one or more activation functions for combining the weighted first subset of bit metrics and the weighted second subset of bit metrics. In some other cases, the bit metric component 835 may apply one or more activation functions for combining the one or more intermediate metrics, or the derived bit metrics to obtain the composite detection metric. In some examples, the activation function may comprise a non-linear transformation.

In some cases, the subset of bit metrics are determined based on single parity check operations or repetition operations from bit metrics at a polarization layer feeding the intermediate polarization layer.

In some cases, the subset of bit metrics correspond to log-likelihood ratios (LLRs) for a corresponding subset of bit channels of the polar code.

The detection mode component 845 may determine the mode for polar detection. In some cases, the determining the mode for polar detection includes selecting a prioritization mode for the polar detection.

In some cases, the determining the mode for polar detection is based on a connection state, a signal metric, a device state, a detection history, a communication protocol, or a combination thereof.

The qualification mode component 850 may select a qualification mode for polar detection.

Figure 9:
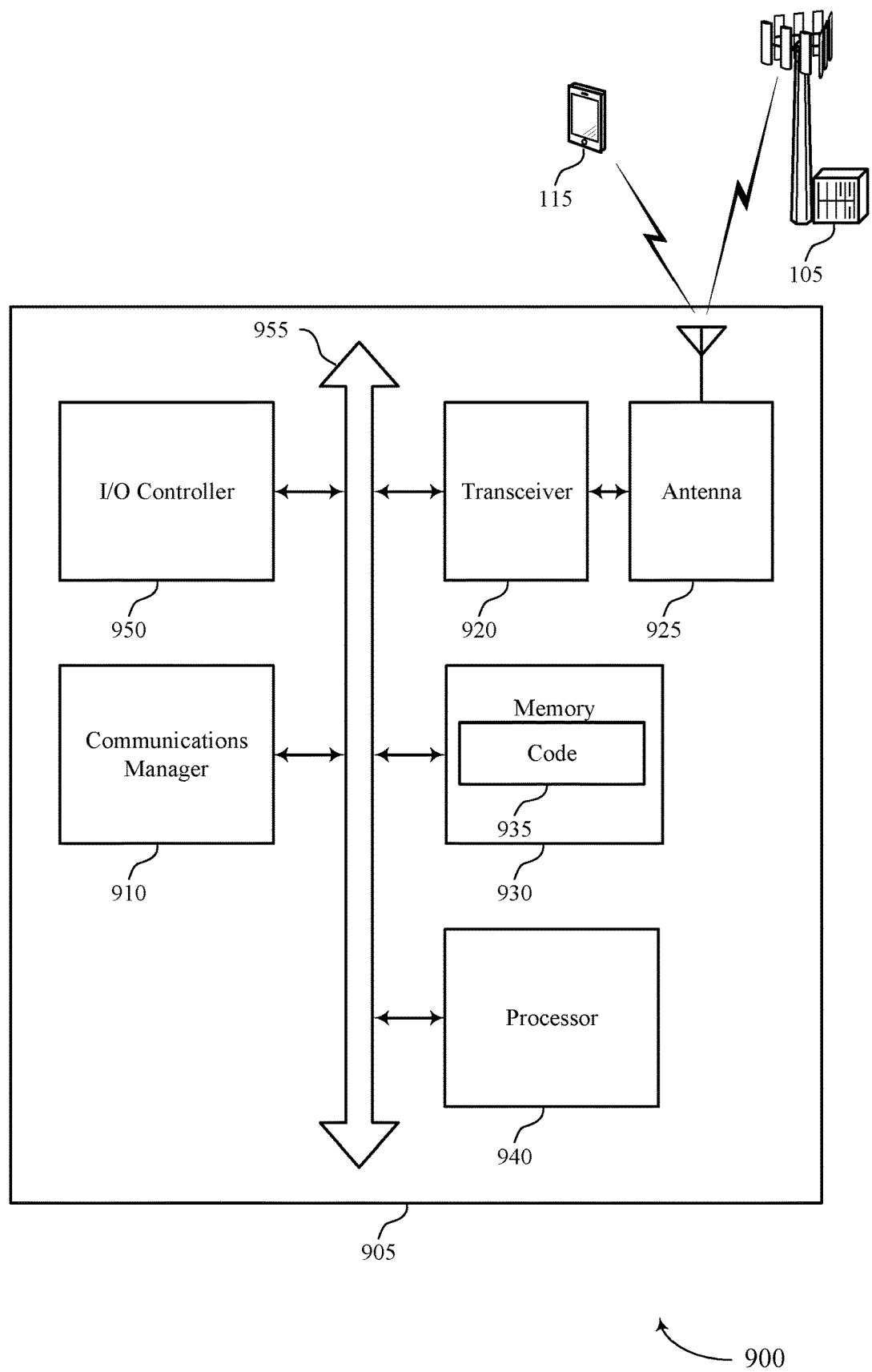
FIG. 9 shows a diagram of a system including a user equipment (UE) that supports efficient polar detection with dynamic control and optimization in accordance with aspects of the present disclosure.

FIG. 9 shows a diagram of a system 900 including a device 905 that supports efficient polar detection with dynamic control and optimization in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, a transceiver 920, an antenna 925, memory 930, a processor 940, and an I/O controller 950. These components may be in electronic communication via one or more buses (e.g., bus 955).

The communications manager 910 may monitor for a decoding candidate of a codeword, where the codeword corresponds to a set of received bit metrics, and the decoding candidate corresponds to a set of information bits encoded using a polar code, determine a composite detection metric for the codeword for the decoding candidate, where the composite detection metric is derived from a subset of bit metrics for an intermediate polarization layer of the polar code, and determine a classification for performing a list decoding process on the codeword according to the decoding candidate based on the composite detection metric.

The communications manager 910 may also receive a search space including a set of decoding candidates associated with a polar code, determine a mode for polar detection for the search space, the polar detection being based on composite detection metrics for the set of decoding candidates, where the composite detection metrics are derived from respective subsets of bit metrics for the set of decoding candidates for at least one intermediate polarization layer of the polar code, and perform a list decoding process for at least one of the set of decoding candidates for the search space based on the mode for polar detection for the search space.

Transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM, ROM, or a combination thereof. The memory 930 may store computer-readable code 935 including instructions that, when executed by a processor (e.g., the processor 940) cause the device to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting efficient polar detection with dynamic control and optimization).

The I/O controller 950 may manage input and output signals for the device 905. The I/O controller 950 may also manage peripherals not integrated into the device 905. In some cases, the I/O controller 950 may represent a physical connection or port to an external peripheral. In some cases, the I/O controller 950 may utilize an operating system such as iOS®, ANDROID®, MS-DOS®, MS-WINDOWS®, OS/2®, UNIX®, LINUX®, or another known operating system. In other cases, the I/O controller 950 may represent or interact with a modem, a keyboard, a mouse, a touchscreen, or a similar device. In some cases, the I/O controller 950 may be implemented as part of a processor. In some cases, a user may interact with the device 905 via the I/O controller 950 or via hardware components controlled by the I/O controller 950.

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
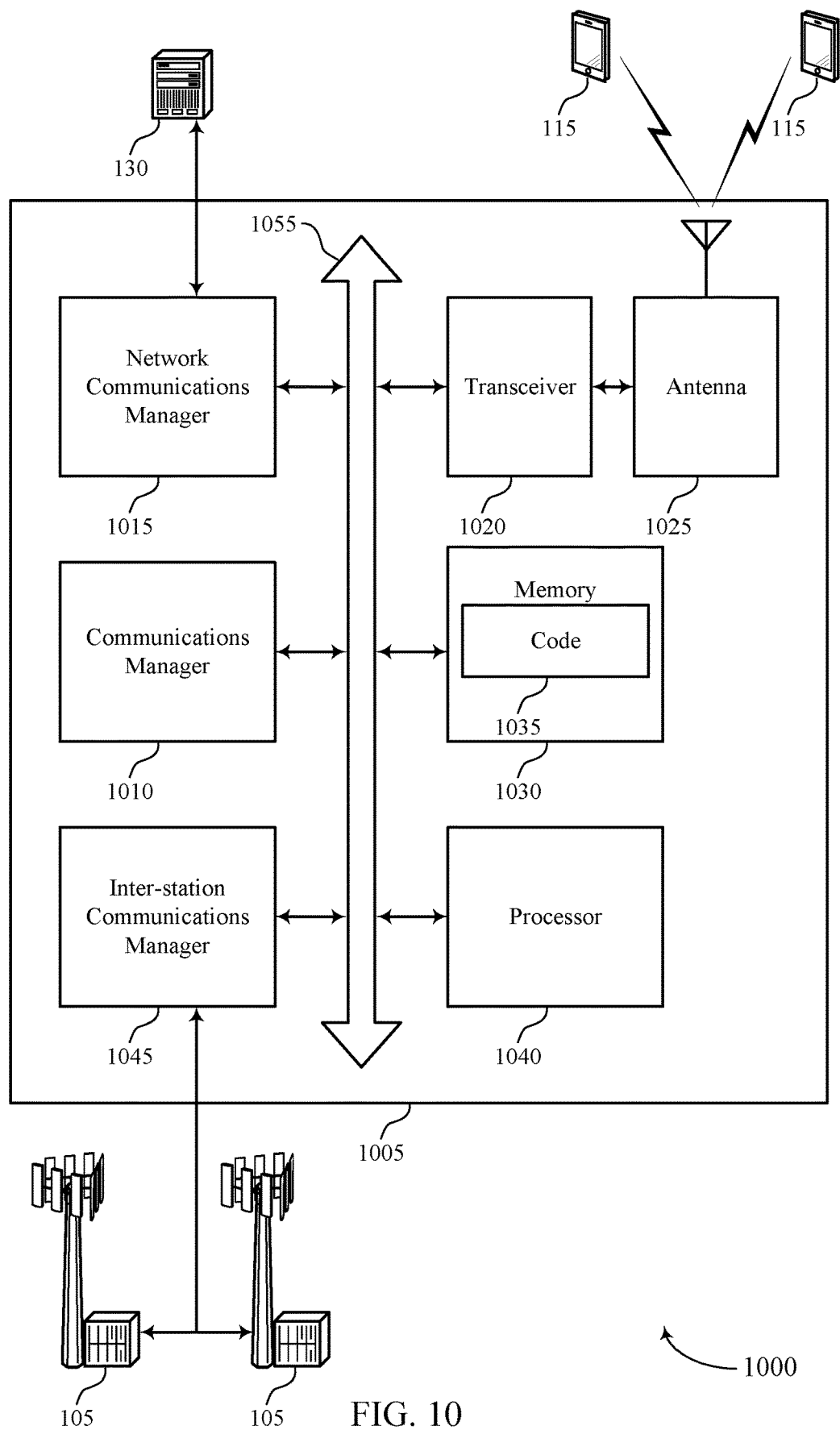
FIG. 10 shows a diagram of a system including a base station that supports efficient polar detection with dynamic control and optimization in accordance with aspects of the present disclosure.

FIG. 10 shows a diagram of a system 1000 including a device 1005 that supports efficient polar detection with dynamic control and optimization in accordance with aspects of the present disclosure. The device 1005 may be an example of or include the components of device 605, device 705, or a base station 105 as described herein. The device 1005 may include components for bi-directional voice and data communications including components for transmitting and receiving communications, including a communications manager 1010, a network communications manager 1015, a transceiver 1020, an antenna 1025, memory 1030, a processor 1040, and an inter-station communications manager 1045. These components may be in electronic communication via one or more buses (e.g., bus 1055).

The communications manager 1010 may monitor for a decoding candidate of a codeword, where the codeword corresponds to a set of received bit metrics, and the decoding candidate corresponds to a set of information bits encoded using a polar code, determine a composite detection metric for the codeword for the decoding candidate, where the composite detection metric is derived from a subset of bit metrics for an intermediate polarization layer of the polar code, and determine a classification for performing a list decoding process on the codeword according to the decoding candidate based on the composite detection metric.

The communications manager 1010 may also receive a search space including a set of decoding candidates associated with a polar code, determine a mode for polar detection for the search space, the polar detection being based on composite detection metrics for the set of decoding candidates, where the composite detection metrics are derived from respective subsets of bit metrics for the set of decoding candidates for at least one intermediate polarization layer of the polar code, and perform a list decoding process for at least one of the set of decoding candidates for the search space based on the mode for polar detection for the search space.

Network communications manager 1015 may manage communications with the core network (e.g., via one or more wired backhaul links). For example, the network communications manager 1015 may manage the transfer of data communications for client devices, such as one or more UEs 115.

Transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM, ROM, or a combination thereof. The memory 1030 may store computer-readable code 1035 including instructions that, when executed by a processor (e.g., the processor 1040) cause the device to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting efficient polar detection with dynamic control and optimization).

Inter-station communications manager 1045 may manage communications with other base station 105, and may include a controller or scheduler for controlling communications with UEs 115 in cooperation with other base stations 105. For example, the inter-station communications manager 1045 may coordinate scheduling for transmissions to UEs 115 for various interference mitigation techniques such as beamforming or joint transmission. In some examples, inter-station communications manager 1045 may provide an X2 interface within an LTE/LTE-A wireless communication network technology to provide communication between base stations 105.

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
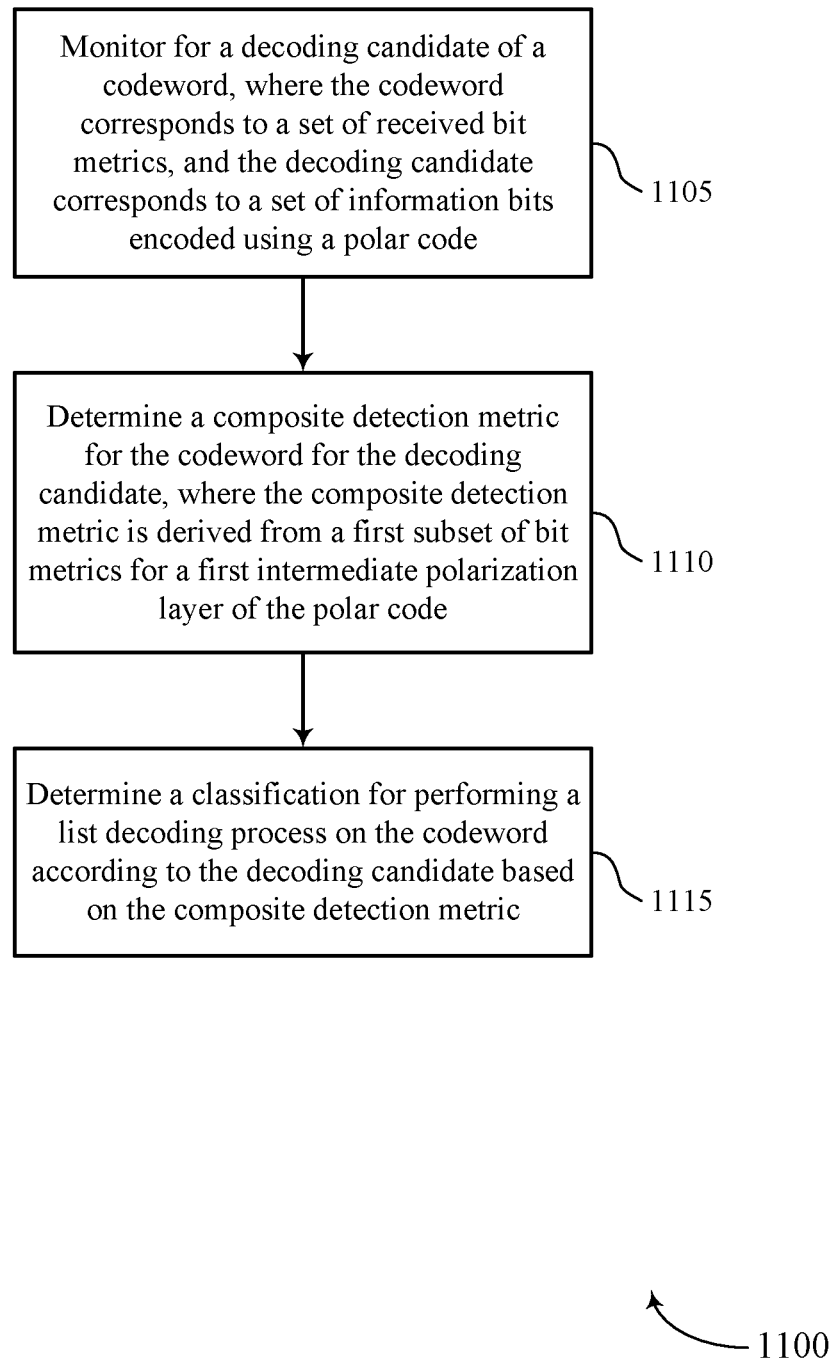
FIGS. 11 and 12 show flowcharts illustrating methods that support efficient polar detection with dynamic control and optimization in accordance with aspects of the present disclosure.

FIG. 11 shows a flowchart illustrating a method 1100 that supports efficient polar detection with dynamic control and optimization in accordance with aspects of the present disclosure. The operations of method 1100 may be implemented by a UE 115 or base station 105 or its components as described herein. For example, the operations of method 1100 may be performed by a communications manager as described with reference to FIGS. 6 through 10. In some examples, a UE or base station may execute a set of instructions to control the functional elements of the UE or base station to perform the functions described below. Additionally or alternatively, a UE or base station may perform aspects of the functions described below using special-purpose hardware.

At 1105, the UE or base station may monitor for a decoding candidate of a codeword, where the codeword corresponds to a set of received bit metrics, and the decoding candidate corresponds to a set of information bits encoded using a polar code. For instance, the UE or base station may monitor a plurality of blind PDCCH decoding hypothesis (e.g., decoding candidates of a codeword search space) in a time duration, such as a slot. The operations of 1105 may be performed according to the methods described herein. In some examples, aspects of the operations of 1105 may be performed by a decoder as described with reference to FIGS. 6 through 10.

At 1110, the UE or base station may determine a composite detection metric for the codeword for the decoding candidate, where the composite detection metric is derived from a first subset of bit metrics for a first intermediate polarization layer of the polar code. In some cases, determining the composite detection metric may comprise applying a weighting vector to the first subset of bit metrics. Further, the UE or base station may apply a second weighting vector to a second subset of bit metrics associated with a second intermediate polarization layer of the polar code, and apply one or more activation functions for combining the weighted first subset of bit metrics and the weighted second subset of bit metrics.

In some other cases, determining the composite detection metric may comprise applying one or more weighting vectors to the first subset of bit metrics to obtain one or more intermediate composite metrics, and applying one or more activation functions for combining the one or more intermediate metrics to obtain the composite detection metric. The operations of 1110 may be performed according to the methods described herein. In some examples, aspects of the operations of 1110 may be performed by one or more of a composite detection metric component, a weighting component, or a bit metric component as described with reference to FIGS. 6 through 10.

At 1115, the UE or base station may determine a classification for performing a list decoding process on the codeword according to the decoding candidate based on the composite detection metric. In some cases, the determining the classification for performing the list decoding process may include determining to suppress the list decoding process for the decoding candidate. Additionally or alternatively, the operations of 1115 may also include determining a ranking for performing the list decoding process on the codeword according to the decoding candidate relative to other decoding candidates of a plurality of decoding candidates for a codeword search space. The operations of 1115 may be performed according to the methods described herein. In some examples, aspects of the operations of 1115 may be performed by a classification component as described with reference to FIGS. 6 through 10.

Figure 12:
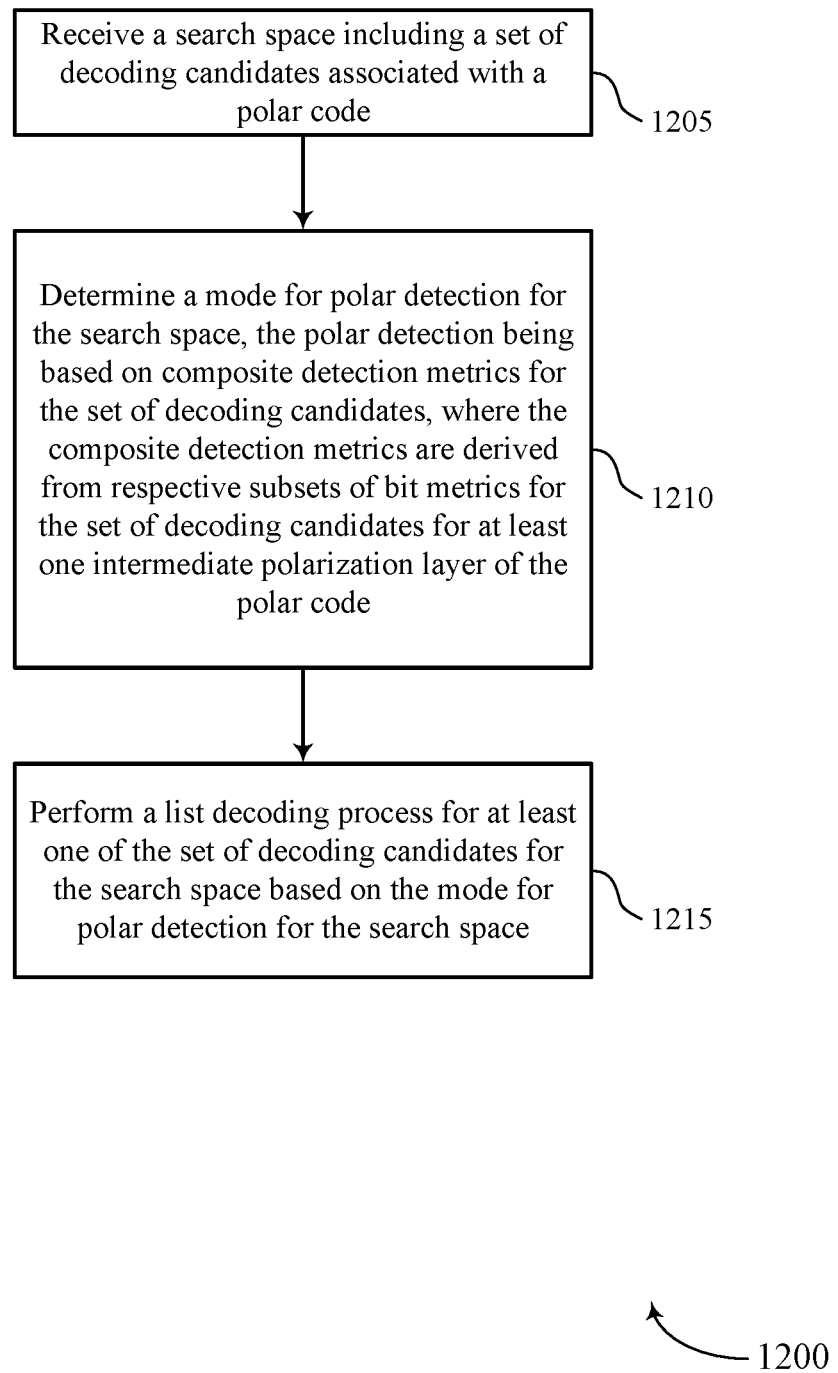

FIG. 12 shows a flowchart illustrating a method 1200 that supports efficient polar detection with dynamic control and optimization in accordance with aspects of the present disclosure. The operations of method 1200 may be implemented by a UE 115 or base station 105 or its components as described herein. For example, the operations of method 1200 may be performed by a communications manager as described with reference to FIGS. 6 through 10. In some examples, a UE or base station may execute a set of instructions to control the functional elements of the UE or base station to perform the functions described below. Additionally or alternatively, a UE or base station may perform aspects of the functions described below using special-purpose hardware.

At 1205, the UE or base station may receive a search space including a set of decoding candidates associated with a polar code. In some cases, the UE or base station may monitor a plurality of blind PDCCH decoding hypothesis (e.g., decoding candidates of a codeword search space) in a time duration, such as a slot, and may receive the search space based on the monitoring. The operations of 1205 may be performed according to the methods described herein. In some examples, aspects of the operations of 1205 may be performed by a decoder as described with reference to FIGS. 6 through 10.

At 1210, the UE or base station may determine a mode for polar detection for the search space, the polar detection being based on composite detection metrics for the set of decoding candidates, where the composite detection metrics are derived from respective subsets of bit metrics for the set of decoding candidates for at least one intermediate polarization layer of the polar code. In some cases, the determining the mode for polar detection may comprise selecting one of a prioritization or qualification mode for the polar detection. In some cases, the determining the mode for polar detection may be based at least in part on a connection state, a signal metric, a device state, a detection history, a communication protocol, or a combination thereof. The operations of 1210 may be performed according to the methods described herein. In some examples, aspects of the operations of 1210 may be performed by one or more of a composite detection metric component, a qualification mode component, or a detection mode component, as described with reference to FIGS. 6 through 10.

At 1215, the UE or base station may perform a list decoding process for at least one of the set of decoding candidates for the search space based on the mode for polar detection for the search space. In some cases, and based in part on the determined mode (i.e., prioritization or qualification) for polar detection, the list decoding process may be performed over the plurality of decoding candidates in an order determined based at least in part on the polar detection, or over a subset of the plurality of decoding candidates determined based at least in part on the polar detection. The operations of 1215 may be performed according to the methods described herein. In some examples, aspects of the operations of 1215 may be performed by a list decoding component as described with reference to FIGS. 6 through 10.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a receiving device, comprising:
   receiving, from a transmitting device via a wireless channel, a plurality of decoding candidates of a codeword, wherein a decoding candidate of the plurality of decoding candidates comprises a set of received bit metrics, and wherein the codeword corresponds to a plurality of information bits encoded using a polar code;
   determining a composite detection metric for the decoding candidate, wherein the composite detection metric is derived from a first subset of bit metrics for a subset of polarization layers of the polar code, the subset of polarization layers comprising an intermediate polarization layer of the polar code;
   performing a list decoding process on the decoding candidate based at least on the composite detection metric; and
   communicating with the transmitting device via the wireless channel based at least on performing the list decoding process on the decoding candidate.

2. The method of claim 1, further comprising:
   determining a second composite detection metric for a second decoding candidate of the plurality of decoding candidates, wherein the second composite detection metric is derived from a second subset of bit metrics for a second subset of polarization layers of the polar code; and
   determining to suppress a second list decoding process for the second decoding candidate.

3. The method of claim 1, wherein performing the list decoding process comprises:
   determining a ranking for performing the list decoding process on the decoding candidate relative to other decoding candidates of the plurality of decoding candidates for a codeword search space, wherein the ranking indicates an order for performing the list decoding process on the decoding candidate relative to the other decoding candidates of the plurality of decoding candidates.

4. The method of claim 1, wherein determining the composite detection metric comprises:
   applying a weighting vector to the first subset of bit metrics.

5. The method of claim 4, wherein determining the composite detection metric comprises:
applying a second weighting vector to a second subset of bit metrics associated with a second intermediate polarization layer of the polar code; and
applying one or more activation functions for combining the weighted first subset of bit metrics and the weighted second subset of bit metrics.

6. The method of claim 1, wherein determining the composite detection metric comprises:
applying one or more weighting vectors to the first subset of bit metrics to obtain one or more intermediate composite metrics; and
applying one or more activation functions for combining the one or more intermediate composite metrics to obtain the composite detection metric.

7. The method of claim 1, wherein determining the composite detection metric comprises:
determining derived bit metrics based at least on the first subset of bit metrics and a weighting pattern, the weighting pattern determined based at least on a number of information bits in a subset of leaf nodes corresponding to the first subset of bit metrics.

8. The method of claim 7, wherein determining the composite detection metric comprises:
applying one or more activation functions for combining the derived bit metrics to obtain the composite detection metric.

9. The method of claim 1, wherein the first subset of bit metrics are determined based at least on single parity check operations or repetition operations from bit metrics at a polarization layer feeding the intermediate polarization layer.

10. The method of claim 1, further comprising:
comparing the composite detection metric to a threshold, wherein the threshold is based at least on a connection state, a signal metric, a device state, a detection history, a communication protocol, or a combination thereof, and wherein performing the list decoding process on the decoding candidate is based at least on comparing the composite detection metric to the threshold.

11. The method of claim 1, wherein the first subset of bit metrics correspond to log-likelihood ratios (LLRs) for a corresponding subset of bit channels of the polar code.

12. A method for wireless communication at a receiving device, comprising:
receiving, from a transmitting device via a wireless channel, a search space comprising a plurality of decoding candidates associated with a polar code;
determining a mode for polar detection for the search space based at least on composite detection metrics for the plurality of decoding candidates, the mode being determined to be a prioritization mode, a qualification mode, or both, wherein the composite detection metrics are derived from respective subsets of bit metrics for the plurality of decoding candidates for a subset of polarization layers of the polar code comprising at least one intermediate polarization layer of the polar code;
performing a list decoding process for at least one of the plurality of decoding candidates for the search space based at least on the mode for polar detection for the search space; and
communicating with the transmitting device via the wireless channel based at least on performing the list decoding process for the at least one of the plurality of decoding candidates for the search space.

13. The method of claim 12, wherein:
the determining the mode for polar detection comprises selecting the prioritization mode for the polar detection; and
the performing the list decoding process comprises performing the list decoding process over the plurality of decoding candidates in an order determined based at least on the polar detection.

14. The method of claim 12, wherein:
the determining the mode for polar detection comprises selecting the qualification mode for the polar detection; and
the performing the list decoding process comprises performing the list decoding process over a subset of the plurality of decoding candidates determined based at least on the polar detection.

15. The method of claim 12, wherein the determining the mode for polar detection is based at least on a connection state, a signal metric, a device state, a detection history, a communication protocol, or a combination thereof.

16. An apparatus for wireless communication at a receiving device, comprising:
a processor,
memory in electronic communication with the processor; and
instructions stored in the memory and executable by the processor to cause the apparatus to:
receive, from a transmitting device via a wireless channel, a plurality of decoding candidates of a codeword, wherein a decoding candidate of the plurality of decoding candidates comprises a set of received bit metrics, and wherein the codeword corresponds to a plurality of information bits encoded using a polar code;
determine a composite detection metric for the decoding candidate, wherein the composite detection metric is derived from a first subset of bit metrics for a subset of polarization layers of the polar code, the subset of polarization layers comprising an intermediate polarization layer of the polar code; and
perform a list decoding process on the decoding candidate based at least on the composite detection metric; and
communicate with the transmitting device via the wireless channel based at least on performing the list decoding process on the decoding candidate.

17. The apparatus of claim 16, wherein the instructions are further executable by the processor to cause the apparatus to:
determine a second composite detection metric for a second decoding candidate of the plurality of decoding candidates, wherein the second composite detection metric is derived from a second subset of bit metrics for a second subset of polarization layers of the polar code; and
determine to suppress a second list decoding process for the second decoding candidate.

18. The apparatus of claim 16, wherein the instructions to perform the list decoding process are executable by the processor to cause the apparatus to:
determining a ranking for performing the list decoding process on the decoding candidate relative to other decoding candidates of the plurality of decoding candidates for a codeword search space, wherein the ranking indicates an order for performing the list decoding process on the decoding candidate relative to the other decoding candidates of the plurality of decoding candidates.

19. The apparatus of claim 16, wherein the instructions to determine the composite detection metric are executable by the processor to cause the apparatus to:
apply a weighting vector to the first subset of bit metrics.

20. The apparatus of claim 19, wherein the instructions to determine the composite detection metric are executable by the processor to cause the apparatus to:
apply a second weighting vector to a second subset of bit metrics associated with a second intermediate polarization layer of the polar code; and
apply one or more activation functions for combining the weighted first subset of bit metrics and the weighted second subset of bit metrics.

21. The apparatus of claim 16, wherein the instructions to determine the composite detection metric are executable by the processor to cause the apparatus to:
apply one or more weighting vectors to the first subset of bit metrics to obtain one or more intermediate composite metrics; and
apply one or more activation functions for combining the one or more intermediate composite metrics to obtain the composite detection metric.

22. The apparatus of claim 16, wherein the instructions to determine the composite detection metric are executable by the processor to cause the apparatus to:
determine derived bit metrics based at least on the first subset of bit metrics and a weighting pattern, the weighting pattern determined based at least on a number of information bits in a subset of leaf nodes corresponding to the first subset of bit metrics.

23. The apparatus of claim 22, wherein the instructions to determine the composite detection metric are executable by the processor to cause the apparatus to:
apply one or more activation functions for combining the derived bit metrics to obtain the composite detection metric.

24. The apparatus of claim 16, wherein the first subset of bit metrics are determined based at least on single parity check operations or repetition operations from bit metrics at a polarization layer feeding the intermediate polarization layer.

25. The apparatus of claim 16, wherein the instructions are further executable by the processor to cause the apparatus to:
compare the composite detection metric to a threshold, wherein the threshold is based at least on a connection state, a signal metric, a device state, a detection history, a communication protocol, or a combination thereof, and wherein performing the list decoding process on the decoding candidate is based at least on comparing the composite detection metric to the threshold.

26. The apparatus of claim 16, wherein the first subset of bit metrics correspond to log-likelihood ratios (LLRs) for a corresponding subset of bit channels of the polar code.

27. An apparatus for wireless communication at a receiving device, comprising:
a processor,
memory in electronic communication with the processor; and
instructions stored in the memory and executable by the processor to cause the apparatus to:
receive, from a transmitting device via a wireless channel, a search space comprising a plurality of decoding candidates associated with a polar code;
determine a mode for polar detection for the search space based at least on composite detection metrics for the plurality of decoding candidates, the mode being determined to be a prioritization mode, a qualification mode, or both, wherein the composite detection metrics are derived from respective subsets of bit metrics for the plurality of decoding candidates for a subset of polarization layers of the polar code comprising at least one intermediate polarization layer of the polar code;
perform a list decoding process for at least one of the plurality of decoding candidates for the search space based at least on the mode for polar detection for the search space; and
communicate with the transmitting device via the wireless channel based at least on performing the list decoding process for the at least one of the plurality of decoding candidates for the search space.

28. The apparatus of claim 27, wherein:
the instructions to determine the mode for polar detection are executable by the processor to cause the apparatus to select the prioritization mode for the polar detection; and
the instructions to perform the list decoding process are executable by the processor to cause the apparatus to perform the list decoding process over the plurality of decoding candidates in an order determined based at least on the polar detection.

29. The apparatus of claim 27, wherein:
the instructions to determine the mode for polar detection are executable by the processor to cause the apparatus to select the qualification mode for the polar detection; and
the instructions to perform the list decoding process are executable by the processor to cause the apparatus to perform the list decoding process over a subset of the plurality of decoding candidates determined based at least on the polar detection.

30. The apparatus of claim 27, wherein the determining the mode for polar detection is based at least on a connection state, a signal metric, a device state, a detection history, a communication protocol, or a combination thereof.

* * * * *